(12) United States Patent
Shekalim

(10) Patent No.: US 10,425,828 B2
(45) Date of Patent: Sep. 24, 2019

(54) SELECTIVE NON-DISTRIBUTION OF RECEIVED UNLICENSED SPECTRUM COMMUNICATION SIGNALS BY A REMOTE UNIT(S) INTO A DISTRIBUTED COMMUNICATIONS SYSTEM (DCS)

(71) Applicant: Corning Optical Communications LLC, Hickory, NC (US)

(72) Inventor: Parwiz Shekalim, Netanya (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/831,968

(22) Filed: Dec. 5, 2017

(65) Prior Publication Data

US 2018/0098226 A1    Apr. 5, 2018

(51) Int. Cl.
| | |
|---|---|
| H04W 16/14 | (2009.01) |
| H04W 24/08 | (2009.01) |
| H04W 88/08 | (2009.01) |
| H04B 15/00 | (2006.01) |

(52) U.S. Cl.
CPC ............ *H04W 16/14* (2013.01); *H04B 15/00* (2013.01); *H04W 24/08* (2013.01); *H04W 88/085* (2013.01)

(58) Field of Classification Search
CPC ... H04W 16/14; H04W 24/08; H04W 88/085; H04B 15/00
USPC ...... 455/424, 67.11, 448, 450, 451, 454, 39, 455/514, 528, 62
See application file for complete search history.

(56) References Cited

U.S. PATENT DOCUMENTS

| | | | |
|---|---|---|---|
| 9,264,910 B2 | 2/2016 | Cook | |
| 2013/0294356 A1* | 11/2013 | Bala | H04W 16/14 370/329 |
| 2015/0055541 A1* | 2/2015 | Zhang | H04W 72/005 370/312 |
| 2016/0100318 A1 | 4/2016 | Wei | |
| 2016/0182134 A1 | 6/2016 | Kol et al. | |
| 2016/0183097 A1 | 6/2016 | Richards et al. | |

(Continued)

FOREIGN PATENT DOCUMENTS

| | | |
|---|---|---|
| WO | 2015023909 A2 | 2/2015 |
| WO | 2015023910 A2 | 2/2015 |
| WO | 2016091073 A1 | 6/2016 |

*Primary Examiner* — Inder P Mehra
(74) *Attorney, Agent, or Firm* — C. Keith Montgomery

(57) ABSTRACT

Selective non-distribution of received unlicensed spectrum communications by a remote unit(s) into a distributed communications system (DCS) is provided. In one aspect, the DCS is configured to receive communications signals in unlicensed spectrum from a source transceiver(s) for communications services. The DCS is configured to distribute the received communications signals in unlicensed spectrum to one or more remote units forming respective remote communications coverage areas. To reduce or avoid signal interference when communication signals in unlicensed spectrum are transmitted into the DCS that is also being used for transmissions by a remote transceiver to a remote unit at the same time, received communications signals by the remote units are monitored for unlicensed spectrum. The remote unit is configured to disable or disconnect the reception and/or transmission of the communications signals in the unlicensed spectrum based on the communication signal activity in the unlicensed spectrum.

21 Claims, 12 Drawing Sheets

(56) References Cited

U.S. PATENT DOCUMENTS

2016/0278118 A1* 9/2016 Yerramalli .............. H04L 5/001
2017/0181197 A1* 6/2017 Aguirre ............. H04W 72/0486
2017/0280341 A1* 9/2017 Nigam ................. H04W 24/10

* cited by examiner

| | STATUS | OCCUPANCY RATE |
|---|---|---|
| 404(1) REMOTE UNIT | CONNECTED | 7% |
| 404(2) REMOTE UNIT | CONNECTED | 5% |
| 404(3) REMOTE UNIT | CONNECTED | 15% |
| 404(4) REMOTE UNIT | CONNECTED | 10% |
| 404(5) REMOTE UNIT | CONNECTED | 4% |
| AGGREGATED* | | 20.4% |

FIG. 8

SELECTIVE NON-DISTRIBUTION OF RECEIVED UNLICENSED SPECTRUM COMMUNICATION SIGNALS BY A REMOTE UNIT(S) INTO A DISTRIBUTED COMMUNICATIONS SYSTEM (DCS)

BACKGROUND

The disclosure relates generally to distributed communications systems (DCS), such as distributed antenna systems (DAS) as an example, and more particularly to selective non-distribution of received unlicensed spectrum communications by a remote unit(s) into a DCS.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of DASs. DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive RF signals from a source.

In this regard, FIG. 1 illustrates distribution of communications services to remote coverage areas 100(1)-100(N) of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) are created by and centered on RAUs 104(1)-104(N) connected to a centralized equipment 106 (e.g., a head-end controller, a head-end unit, or a central unit). The centralized equipment 106 may be communicatively coupled to a source transceiver 108, such as for example, a base transceiver station (BTS) or a baseband unit (BBU). In this regard, the centralized equipment 106 receives downlink communications signals 110D from the source transceiver 108 to be distributed to the RAUs 104(1)-104(N). The downlink communications signals 110D can include data communications signals and/or communication signaling signals, as examples. The RAUs 104(1)-104(N) are configured to receive the downlink communications signals 110D from the centralized equipment 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver (not shown) and a respective antenna 114(1)-114(N) operably connected to the RF transmitter/receiver to wirelessly distribute the communications services to user equipment (UE) 116 within the respective remote coverage areas 100(1)-100(N). The RAUs 104(1)-104(N) are also configured to receive uplink communications signals 110U from the UEs 116 in the respective remote coverage areas 100(1)-100(N) to be distributed to the source transceiver 108.

The source transceiver 108 discussed above with regard to the DAS 102 in FIG. 1 is configured to transmit licensed spectrum. Licensed spectrum is spectrum (i.e., a signal frequency band) purchased by a carrier for exclusive use for communications services to avoid interference with other carrier communications signals. For example, cellular communications services are provided in licensed spectrum in licensed communications frequency bands between 700 MegaHertz (MHz)-1900 MHz. Use of licensed spectrum also allows for communications services in licensed spectrum to be managed. For example, long term evolution (LTE) technology is a managed technology where each UE has to be identified by a LTE base station. The LTE base station controls time slots when the UE can transmit and receive communications signals. However, purchasing licensed spectrum is expensive. On the other hand, unlicensed spectrum is spectrum that is made available for use by any carrier or communication service equipment without licensing. Thus, unlicensed spectrum is advantageously supported by many devices and equipment with communications capabilities to avoid the need to purchase licensed spectrum. For example, 5 GHz is an unlicensed spectrum that is used in access points (APs) for WiFi communications as well as other communications devices, such as cordless phones. In this regard, carriers can advantageously provide BTSs or BBUs designed to transmit communications signals in unlicensed spectrum to take advantage of the additional bandwidth provided by the unlicensed spectrum. In this regard, as shown in FIG. 2A, the source transceiver 108 may be configured to transmit downlink communications signals 110D in an unlicensed communications frequency band. As shown in FIG. 2B, the source transceiver 108 may also be configured to transmit downlink communications signals 110D (e.g., data and signaling signals) in a licensed communications frequency band and other data communications signals in an unlicensed communications frequency band. However, use of unlicensed spectrum can cause mutual interference issues between a source transceiver and other transceivers both transmitting in the same unlicensed spectrum at the same time. Use of unlicensed spectrum can be even more problematic in DASs, such as the DAS 102 in FIG. 1, because the DAS expands the reach of the source transceiver to multiple remote coverage areas.

Because of the desire by communications service providers to use unlicensed spectrum to gain additional bandwidth without additional licensing costs, mechanisms have been designed and implemented to avoid or reduce interference issues with use of unlicensed spectrum. One such mechanism is "Listen Before Talk (LBT)." LBT is a mechanism proposed by the $3^{rd}$ Generation Partnership Project (3GPP) for minimizing interferences between two transceivers operating in the same unlicensed channel(s). In this regard, a transceiver can start signal transmission of a communications signal in an unlicensed channel after verifying that the unlicensed channel is free for use, meaning that another transceiver is not presently transmitting signals in the same unlicensed channel. Before transmission, the transceiver first listens to the activity "on the air" (i.e., on the unlicensed channel where it intends to transmit), or verifies that the unlicensed channel is not occupied by another transmission. If a transmission in the same unlicensed channel is detected, the transmitter postpones its intended transmission until the unlicensed channel is free. When two transceivers coordinate their activity through use of LBT, each transceiver will have a certain likelihood of finding transmission opportunities where an unlicensed channel is free for transmission signals. However, when a source transceiver, such as a BTS or BBU for example, coupled to a DAS transmits communications signals in unlicensed channels to the DAS for distribution, the source transceiver will have to coordinate its activity with all unlicensed transceivers transmitting signals to the remote units in the DAS (i.e., "seen" by the DAS). This can force the source transceiver to remain silent for long periods, thus significantly lowering the throughput of the communications services supported by the DAS. Even one remote unit distributing unlicensed communications signals in a DAS may be enough to cause a source transceiver to be silent in unlicensed channels for long periods of time.

No admission is made that any reference cited herein constitutes prior art. Applicant expressly reserves the right to challenge the accuracy and pertinency of any cited documents.

SUMMARY

Embodiments of the disclosure relate to selective non-distribution of received unlicensed spectrum communications by a remote unit(s) into a distributed communications system (DCS). Unlicensed spectrum is frequency bands that anyone is free to use to operate wireless devices. As a non-limiting example, the remote unit can be a remote antenna unit (RAU) in a DCS provided as a distributed antenna system (DAS). In this regard, in one aspect, the DCS is configured to receive communications signals in unlicensed spectrum from a signal source transceiver(s) for communications services. The DCS is configured to distribute and/or receive communications signals in unlicensed spectrum to and/or from one or more remote units forming respective remote communications coverage areas. If communications signals transmitted by the source transceiver(s) into the DCS or received from other devices associated with the DCS are in unlicensed spectrum (e.g., in an unlicensed spectrum channel) that is also being used for transmission of communications signals by other transceiver (e.g., a WiFi access point) at the same time, even for a short period of time, mutual signal interference can occur between the source transceiver and the remote transceiver. In this regard, to reduce or avoid signal interference in unlicensed spectrum, received communications signals by the DCS are monitored for unlicensed spectrum. The remote unit is configured to disable or disconnect the reception and/or transmission of the communications signals in the unlicensed spectrum based on the communication signal activity in the unlicensed spectrum. As non-limiting examples, a remote unit could be configured to disable or disconnect distribution of the communications signals in an unlicensed spectrum based on the receiving the unlicensed spectrum beyond a defined period of time, based on a communications signal activity threshold, and/or based on the throughput impact to the communications services provided by the source transceiver(s). In this manner, the source transceiver does not have to be silenced, such as in a listen before talk (LBT) configuration where the source transceiver can be silenced or silenced for long periods of time during the transmission of the interfering communications signals in the unlicensed spectrum by the remote transceiver.

An additional embodiment of the disclosure relates a remote unit in a DCS. The remote unit comprises at least one downlink communications interface configured to receive unlicensed downlink RF communications signals from at least one downlink communications medium. The remote unit also comprises at least one antenna configured to receive unlicensed uplink RF communications signals from user equipment (UE) and communicate the received unlicensed downlink RF communications signals to UE. The remote unit also comprises at least one unlicensed communications signal path configured to receive at least one of the unlicensed uplink RF communications signals and the unlicensed downlink RF communications signals. The at least one unlicensed communications signal path comprises at least one signal path control circuit configured to be selectively controlled to enable and disable the at least one unlicensed communications signal path. The remote unit also comprises at least one uplink communications interface configured to receive the unlicensed uplink RF communications signals for coupling to at least one uplink communications medium. The remote unit also comprises a remote unit controller. The remote unit controller is configured to monitor unlicensed communications signals in the at least one unlicensed communications signal path. The remote unit controller is also configured to determine unlicensed signal activity of the unlicensed communications signals in the at least one unlicensed communications signal path. The remote unit controller is also configured to selectively control the at least one signal path control circuit to disable the at least one unlicensed communications signal path based on the determined unlicensed signal activity exceeding a defined signal activity level.

An additional embodiment of the disclosure relates to a method for disabling unlicensed communications services in a remote unit in a DCS. The method comprises receiving unlicensed downlink RF communications signals from at least one downlink communications medium. The method also comprises receiving unlicensed uplink RF communications signals from UE over at least one antenna. The method also comprises communicating the received unlicensed downlink RF communications signals over the least one antenna to UE. The method also comprises receiving unlicensed uplink RF communications signals comprising at least one of the unlicensed uplink RF communications signals and the unlicensed downlink RF communications signals in at least one unlicensed communications signal path. The method also comprises distributing the unlicensed communications signals over at least one uplink communications medium. The method also comprises monitoring the unlicensed communications signals in the at least one unlicensed communications signal path. The method also comprises determining unlicensed signal activity of the unlicensed communications signals in the at least one unlicensed communications signal path. The method also comprises selectively disabling the at least one unlicensed communications signal path based on the determined unlicensed signal activity exceeding a defined signal activity level.

An additional embodiment of the disclosure relates to a DCS. The DCS comprises a central unit. The central unit is configured to receive unlicensed uplink RF communications signals over at least one uplink communications medium from a plurality of remote units. The central unit is also configured to distribute the unlicensed uplink RF communications signals to at least one source transceiver. The central unit is also configured to receive unlicensed downlink RF communications signals from the at least one source transceiver. The central unit is also configured to distribute the unlicensed downlink RF communications signals over at least one downlink communications medium to the plurality of remote units. Each remote unit among the plurality of remote units comprises at least one downlink communications interface configured to receive the unlicensed downlink RF communications signals from the at least one downlink communications medium. Each remote unit among the plurality of remote units also comprises at least one antenna configured to receive the unlicensed uplink RF communications signals from UE and distribute the unlicensed downlink RF communications signals to UE. Each remote unit among the plurality of remote units also comprises at least one unlicensed communications signal path configured to receive at least one of the unlicensed uplink RF communications signals and the unlicensed downlink RF communications signals. The at least one unlicensed communications signal path comprises at least one signal path control circuit configured to be selectively controlled to enable and disable the at least one unlicensed communications signal path. The at least one unlicensed communications signal path also comprises at least one uplink communications interface configured to receive the unlicensed uplink RF communications signals for distributing the unlicensed uplink RF communications signals over the at least one uplink communications medium to be received by the central unit. Each remote unit among the plurality of remote units also comprises a remote unit controller. The remote unit controller is configured to monitor unlicensed communications signals in the at least one unlicensed communications signal path. The remote unit controller is also configured to communicate an unlicensed signal report regarding the unlicensed communications signals in the at least one unlicensed communications signal path for each remote unit among the plurality of remote units to a central controller. The remote unit controller is also configured to selectively control the at least one signal path control circuit to disable the at least one unlicensed communications signal path in response to receipt of an unlicensed disable command.

The central controller is configured to receive the unlicensed signal report from each remote unit among the plurality of remote units. The central controller is also configured to determine unlicensed signal activity for each remote unit among the plurality of remote units based on the received unlicensed signal report from each remote unit among the plurality of remote units. The central controller is also configured to selectively communicate an unlicensed disable command to the remote unit controller of at least one remote unit among the plurality of remote units to cause the remote unit controller of the at least one remote unit to disable the at least one signal path control circuit of the at least one remote unit to disable the at least one unlicensed communications signal path of the at least one remote unit, based on the unlicensed signal activity in the plurality of remote units.

An additional embodiment of the disclosure relates to a method for disabling unlicensed communications services in a remote unit in a DCS. The method comprises receiving unlicensed uplink RF communications signals over at least one uplink communications medium from a plurality of remote units. The method also comprises distributing the unlicensed uplink RF communications signals to at least one source transceiver. The method also comprises receiving unlicensed downlink RF communications signals from the at least one source transceiver. The method also comprises distributing the unlicensed downlink RF communications signals over at least one downlink communications medium to the plurality of remote units. The method also comprises receiving an unlicensed signal report from each of the plurality of remote units regarding unlicensed communications signals comprising at least one of the unlicensed uplink RF communications signals and the unlicensed downlink RF communications signals in at least one unlicensed communications signal path for the remote unit. The method also comprises determining unlicensed signal activity for each remote unit among the plurality of remote units based on the received unlicensed signal report from each remote unit among the plurality of remote units. The method also comprises selectively communicating an unlicensed disable command to a remote unit controller of at least one remote unit among the plurality of remote units to cause the remote unit controller of the at least one remote unit to disable the at least one unlicensed communications signal path of the at least one remote unit, based on the unlicensed uplink signal activity in the plurality of remote units.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 8 is a table illustrating an exemplary remote unit unlicensed spectrum occupancy report indicating the presence rate of unlicensed spectrum communication signals in the unlicensed communication signal paths of the remote units in the DCS in FIG. 4, which can be used to provide centralized control of unlicensed communications signal paths in the remote units;

FIG. 11 is a partially schematic cut-away diagram of an exemplary building infrastructure in which a DCS, including but not limited to the DCS in FIG. 4, can be provided, wherein unlicensed communications signal paths in the remote units are configured to be disabled or disconnected to disable distribution of unlicensed communications signals based on monitored communications signal activity in unlicensed spectrum on the unlicensed communications signal path(s) in the remote units.

DETAILED DESCRIPTION

Embodiments of the disclosure relate to selective non-distribution of received unlicensed spectrum communications by a remote unit(s) into a distributed communications system (DCS). Unlicensed spectrum is frequency bands that anyone is free to use to operate wireless devices. As a non-limiting example, the remote unit can be a remote antenna unit (RAU) in a DCS provided as a distributed antenna system (DAS). In this regard, in one aspect, the DCS is configured to receive communications signals in unlicensed spectrum from a signal source transceiver(s) for communications services. The DCS is configured to distribute the received communications signals in unlicensed spectrum to one or more remote units forming respective remote communications coverage areas. If communications signals transmitted by the source transceiver(s) into the DCS are in unlicensed spectrum (e.g., in an unlicensed spectrum channel) that is also being used for transmission of communications signals by a remote transceiver (e.g., a WiFi access point) to a remote unit in the DCS at the same time, mutual signal interference can occur between the source transceiver and the remote transceiver. In this regard, to reduce or avoid signal interference in unlicensed spectrum, received communications signals by the remote units are monitored for unlicensed spectrum. The remote unit is configured to disable or disconnect the reception and/or transmission of the communications signals in the unlicensed spectrum based on the communication signal activity in the unlicensed spectrum. As non-limiting examples, a remote unit could be configured to disable or disconnect distribution of the communications signals in an unlicensed spectrum based on the receiving the unlicensed spectrum beyond a defined period of time, based on a communications signal activity threshold, and/or based on the throughput impact to the communications services provided by the source transceiver(s). In this manner, the source transceiver does not have to be silenced, such as in a listen before talk (LBT) configuration where the source transceiver can be silenced or silenced for long periods of time during the transmission of the interfering communications signals in the unlicensed spectrum by the remote transceiver.

Figure 1:
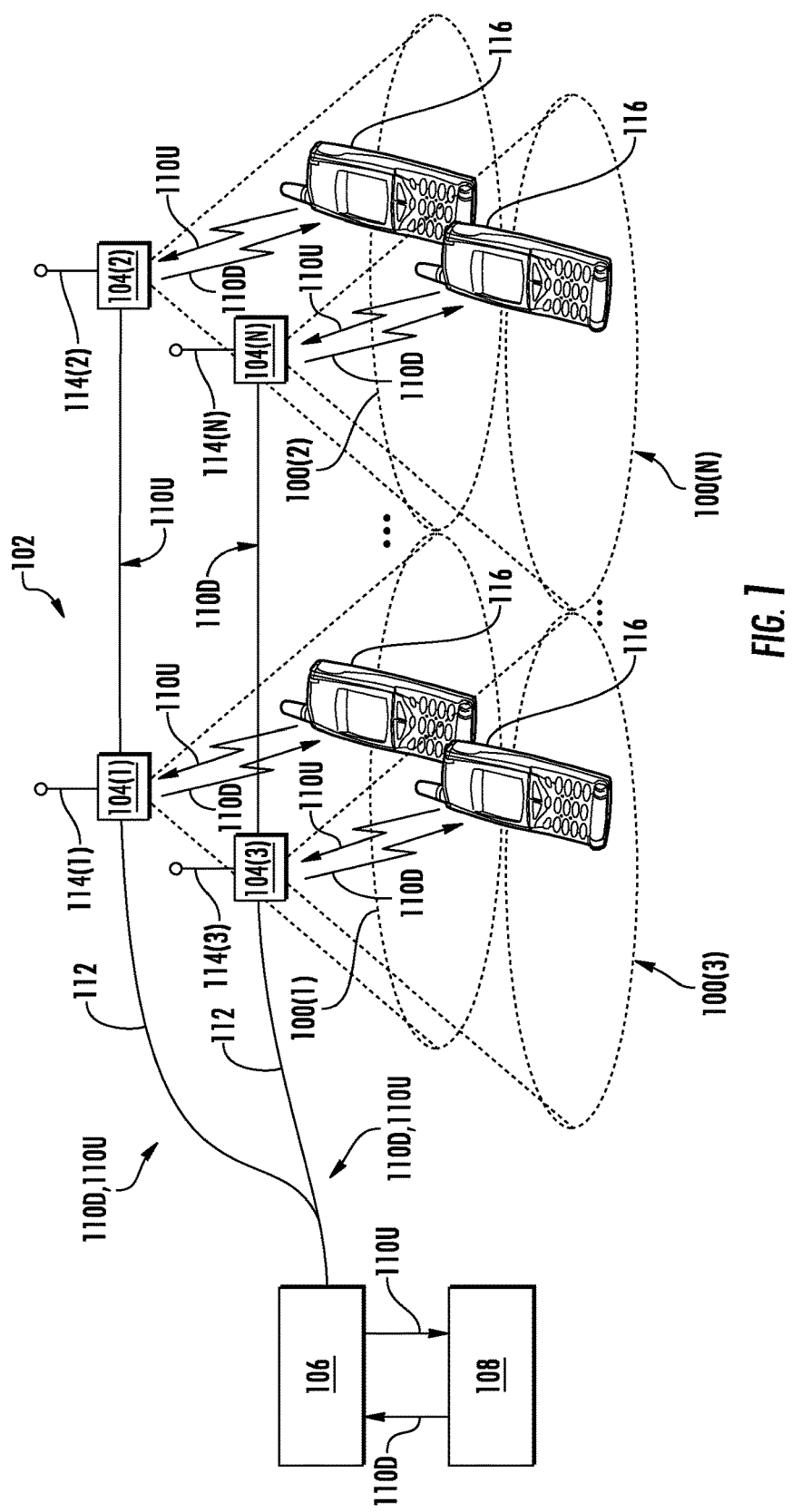
FIG. 1 is a schematic diagram of an exemplary distributed communications system (DC S)
Figure 2A:
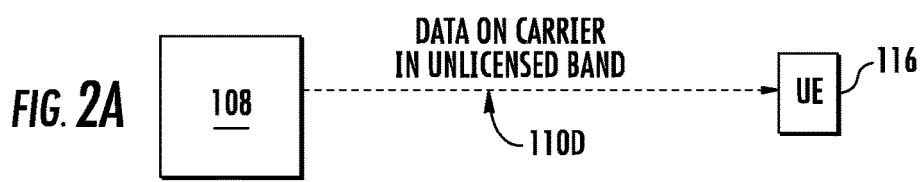
FIGS. 2A and 2B are schematic diagrams illustrating a source transceiver communicating data communication signals and communication signaling signals on unlicensed and licensed spectrum communications signals.
Figure 2B:
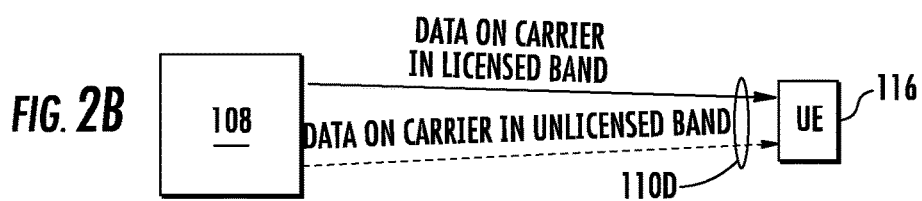
Figure 3A:
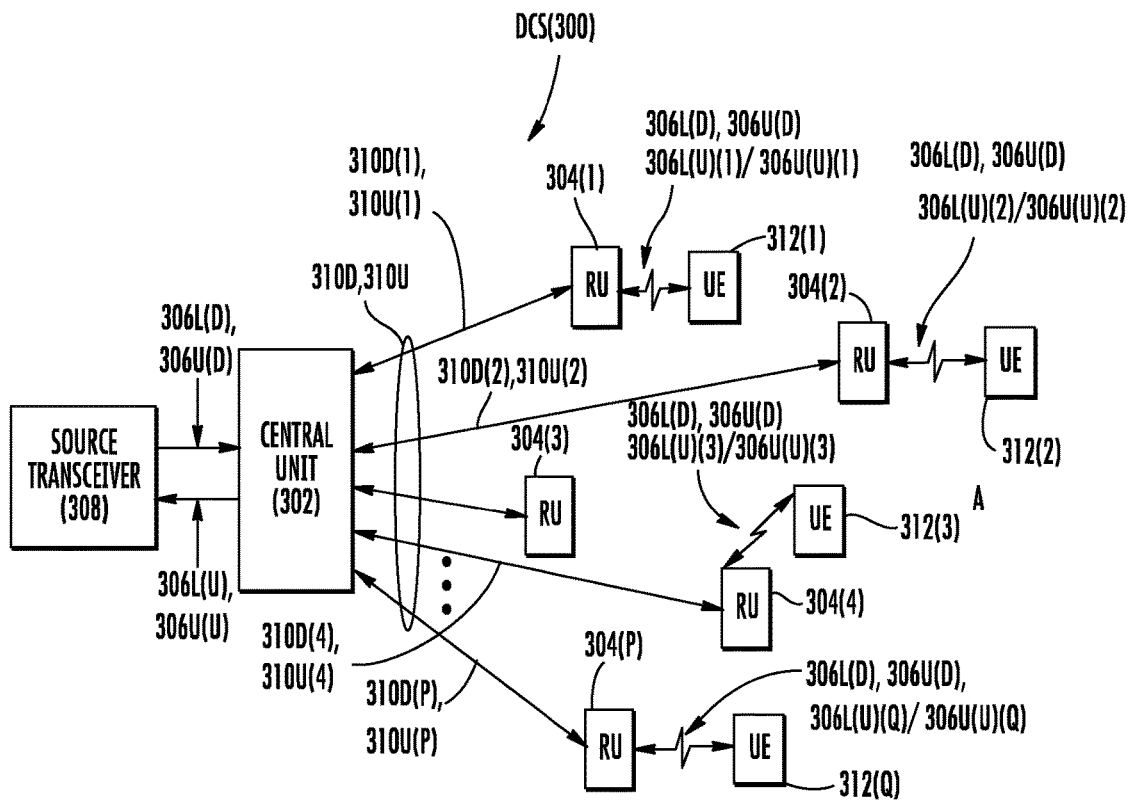
FIG. 3A is a schematic diagram of an exemplary DCS illustrating a source transceiver receiving unlicensed spectrum communications signals from user equipment through remote units in remote coverage areas.

FIG. 3A is a schematic diagram of an exemplary an DCS 300 that is configured to support licensed and unlicensed communications signals in licensed and unlicensed spectrum. In this regard, the DCS 300 includes a central unit 302 and a plurality of remote units 304(1)-304(P). For example, the central unit 302 may be included in head-end equipment. The remote units 304(1)-304(P) may be remote antenna units that each include an antenna for communicating wireless communications signals to user equipment (UE). The central unit 302 is configured to receive licensed downlink RF communications signals 306L(D) in licensed spectrum and unlicensed downlink RF communications signals 306U(D) in unlicensed spectrum from a source transceiver 308. For example, the source transceiver 308 may be a base station transceiver (BTS) or a baseband unit (BBU), as examples. The source transceiver 308 may be configured to support transmission of the unlicensed downlink RF communications signals 306U(D) in unlicensed spectrum to achieve additional bandwidth beyond supported licensed spectrum, as an example. The central unit 302 is configured to distribute the unlicensed downlink RF communications signals 306U(D) over downlink communications medium 310D(1)-310D(P) to one or more of the remote units 304(1)-304(P) to be distributed to UE 312(1)-312(Q) in the communication range of the remote units 304(1)-304(P).

With continuing reference to FIG. 3A, the remote units 304(1)-304(P) are configured to receive licensed and/or unlicensed uplink RF communications signals 306L(U)(1)-306L(U)(Q), 306U(U)(1)-306U(U)(Q) from UE 312(1)-312(Q) to be distributed over the uplink communications medium 310U(1)-310U(P) to the central unit 302 to be distributed to the source transceiver 308. For example, the UE 312(1)-312(Q) may include cellular devices that are configured to receive licensed downlink RF communications signals 306L(D) and transmit licensed uplink RF communications signals 306L(U) in licensed spectrum. As another example, the UE 312(1)-312(Q) may include unlicensed spectrum communication devices that are configured to receive unlicensed downlink RF communications signals 306U(D) and transmit unlicensed uplink RF communications signals 306U(U) in unlicensed spectrum. For example, the UE 312(1)-312(Q) could include access points (APs) that support Wireless Fidelity (WiFi) transmissions in the 5 GigaHertz unlicensed spectrum, for example.

Because of the desire by communications service providers to use unlicensed spectrum to gain additional bandwidth without additional licensing costs, mechanisms have been designed and implemented to avoid or reduce interference issues with use of unlicensed spectrum. One such mechanism is "Listen Before Talk (LBT)." LBT is a mechanism proposed by the $3^{rd}$ Generation Partnership Project (3GPP) for minimizing interferences between two transceivers operating in the same unlicensed channel(s). In this regard, using the DCS 300 in FIG. 3A as an example, the source transceiver 308 can start transmission of the unlicensed downlink RF communications signal 306U(D) in an unlicensed channel after verifying that the unlicensed channel is free for use, meaning that another proximity transceiver is not presently transmitting signals in the same unlicensed channel. Before transmission, the source transceiver 308 first listens to the activity "on the air" (i.e., on the unlicensed channel where it intends to transmit), or verifies that the unlicensed channel is not occupied by another transmission. If a transmission in the same unlicensed channel is detected, the source transceiver 308 can postpone its intended transmission until the unlicensed channel is free. When the source transceiver 308 and another transceiver coordinate their activity through use of LBT, each transceiver will have a certain likelihood of finding transmission opportunities where an unlicensed channel is free for transmission signals.

Figure 3B:
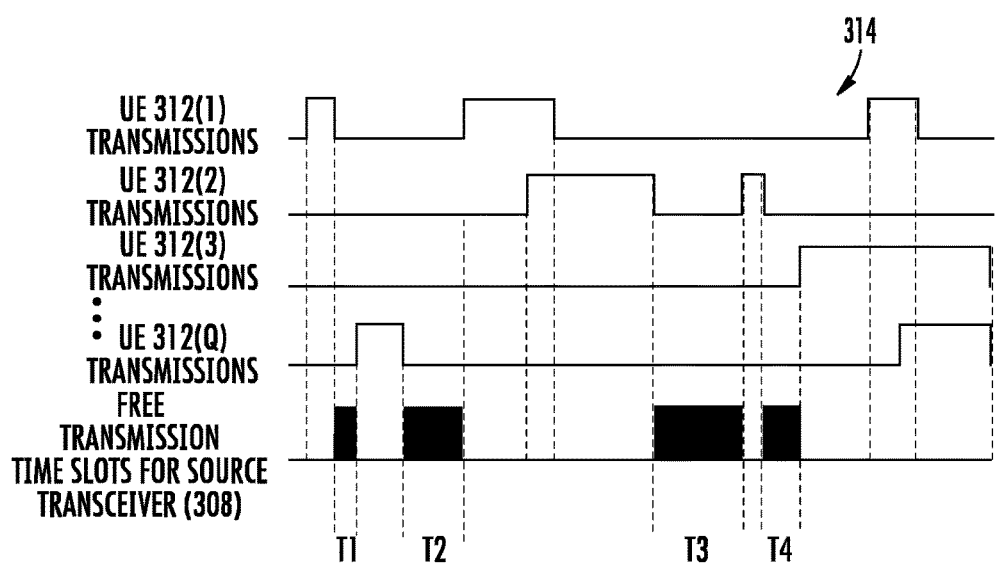
FIG. 3B is a timing diagram illustrating exemplary timing of transmitted communications signals in unlicensed spectrum by user equipment to the remote units in the DCS in FIG. 3A, to further illustrate free time slots available for the source transceiver to transmit communications signals in the unlicensed spectrum.

However, when the source transceiver 308 coupled to the DCS 300 shown in FIG. 3A, as an example, transmits unlicensed downlink RF communications signals 306U(D) in unlicensed channels to the DCS 300 for distribution, the source transceiver 308 coordinates its activity with unlicensed UEs 312(1)-312(Q) transmitting signals to the remote units 304(1)-304(P) in the DCS 300 (i.e., "seen" by the DCS 300). The source transceiver 308 avoids transmitting the unlicensed downlink RF communications signals 306U(D) in the same frequency band or channel at the same time as the UEs 312(1)-312(Q) transmit unlicensed uplink RF communications signals 306U(U). This is shown in timing diagram 314 in FIG. 3B, where the timings of transmissions of unlicensed uplink RF communications signals 306U(U) by UEs 312(1)-312(Q) being received by remote units 304(1)-304(2), 304(4)-304(P) shown. As shown, only time periods or slots $T_1$, $T_2$, $T_3$, and $T_4$ are free meaning that no transmissions of unlicensed uplink RF communications signals 306U(U) by UEs 312(1)-312(Q) are occurring during those time slots. Thus, the source transceiver 308 remains silent except during time slots $T_1$, $T_2$, $T_3$, and $T_4$, which are free for transmission of unlicensed downlink RF communications signals 306D(U), thus effectively limiting the throughput of the communications services in the DCS 300. Even one remote unit 304(1)-304(P) receiving unlicensed uplink RF communications signals 306U(U) may enough to cause the source transceiver 308 to be silent in unlicensed channels for long periods of time.

Figure 4:
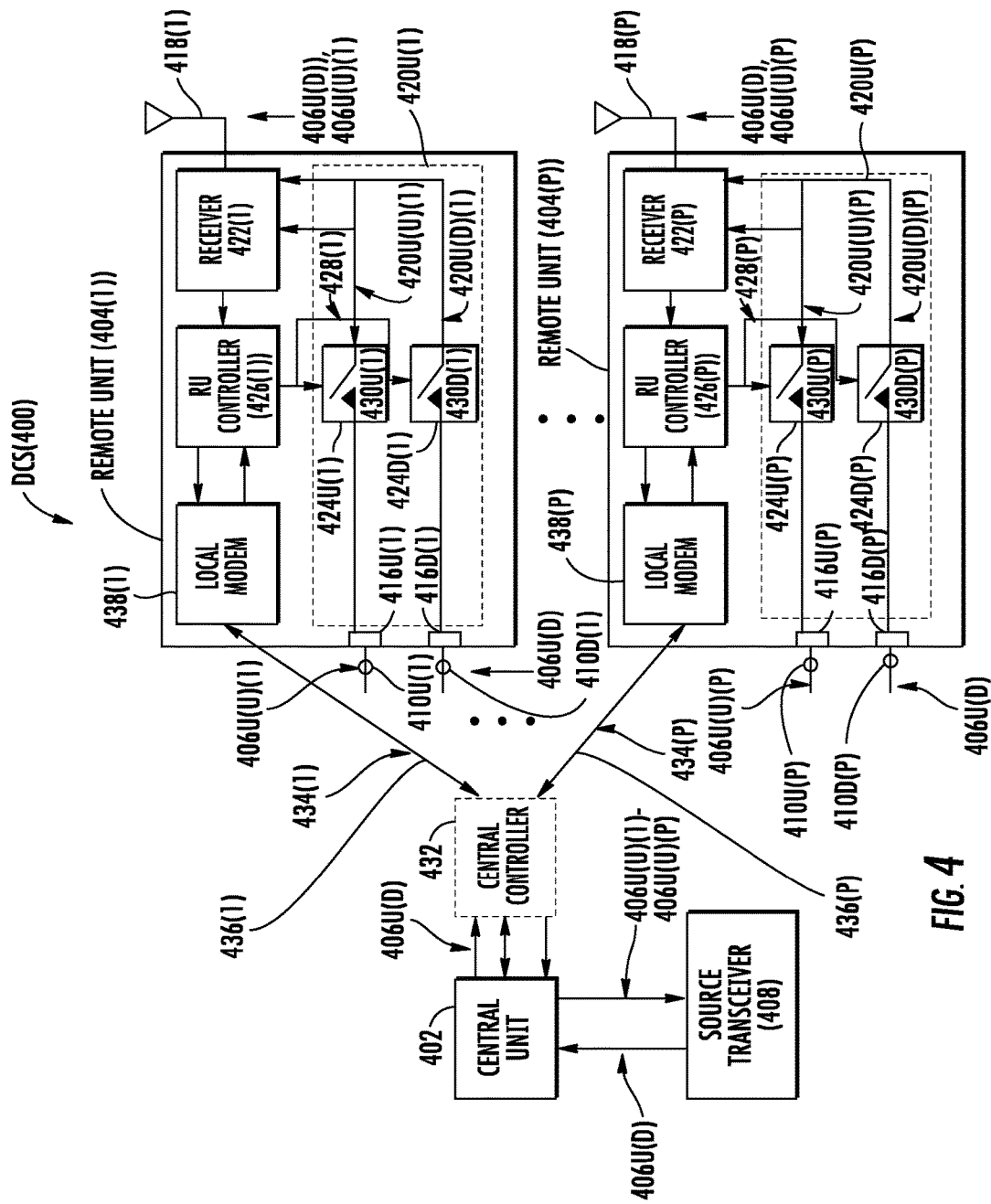
FIG. 4 is a schematic diagram of an exemplary DCS comprising a plurality of remote units each configured with an unlicensed communications signal path(s) to support distribution of unlicensed communication signals, wherein the unlicensed communications signal path(s) in the remote units are configured to be disabled or disconnected to disable distribution of unlicensed communications signals based on monitored communications signal activity in unlicensed spectrum on the unlicensed communications signal path(s) in the remote units.

In this regard, FIG. 4 is a schematic diagram of an exemplary DCS 400 in the form of a DAS that is configured to distribute RF communications signals over communications links to a plurality of remote units forming remote RF communications coverage areas in this example. The DCS 400 is configured to be coupled to a source transceiver 408 to distribute unlicensed downlink RF communications signals 406U(D) received from the source transceiver 408 to remote units 404(1)-404(P) to be distributed to UE (not shown). As will be discussed in more detail below, the DCS 400 is configured to disable or disconnect distribution of unlicensed communications signals distributed through remote units 404(1)-404(P) based on monitored communications signal activity in unlicensed spectrum on unlicensed communications signal paths in the remote units 404(1)-404(P). In this manner, the source transceiver 408 does not have to be silenced, such as in a listen before talk (LBT) configuration where the source transceiver 408 can be silenced or silenced for long periods of time during the transmission of the interfering unlicensed downlink RF communications signals 406U(D). Thus, signal interference in unlicensed spectrum can be reduced or avoided, thus improving communication services throughput in the DCS 400 without risking interference that can reduce signal quality.

The DCS 400 includes a central unit 402 and the plurality of remote units 404(1)-404(P). For example, the central unit 402 may be included in head-end equipment. The remote units 404(1)-404(P) may be remote antenna units that each include an antenna for communicating wireless communications signals to UE. The central unit 402 is configured to receive unlicensed downlink RF communications signals 406U(D) in unlicensed spectrum from the source transceiver 408. For example, the source transceiver 408 may be a base station transceiver (BTS) or a baseband unit (BBU), as examples. The source transceiver 408 may be configured to support transmission of the unlicensed downlink RF communications signals 406U(D) in unlicensed spectrum to achieve additional bandwidth beyond supported licensed spectrum, as an example. The central unit 402 is configured to distribute the unlicensed downlink RF communications signals 406U(D) over downlink communications medium 410D(1)-410D(P) to remote units 404(1)-404(P) to be distributed to UE in the communication range of the remote units 404(1)-404(P).

With continuing reference to FIG. 4, the remote units 404(1)-404(P) in the DCS 400 in this example each include a downlink communications interface 416D(1)-416D(P) configured to receive the unlicensed downlink RF communications signals 406U(D) from the central unit 402 over a respective downlink communications medium 410D(1)-410D(P). The remote units 404(1)-404(P) each include at least one antenna 418(1)-418(P) configured to receive unlicensed uplink RF communications signals 406U(U)(1)-406U(U)(P) from UE and communicate the received unlicensed downlink RF communications signals 406U(D) to UE. The unlicensed downlink RF communications signals 406U(D) and unlicensed uplink RF communications signals 406U(U) are considered unlicensed RF communications signals 406U. The remote units 404(1)-404(P) also each include a respective uplink communications interface 416U(1)-416U(P) each configured to receive the unlicensed uplink RF communications signals 406U(U)(1)-406U(U)(P) for coupling to respective uplink communications medium 410U(1)-410U(P) for distribution directly or indirectly to the central unit 402. For example, note that respective uplink communications interfaces 416U(1)-416U(P) could be configured to be coupled directly to the central unit 402 or indirectly through an upstream remote unit(s) 404(1)-404(P) configured in a daisy-chain configuration, for distributing unlicensed uplink RF communications signals 406U(U)(1)-406U(U)(P) to the central unit 402. Each remote unit 404(1)-404(P) also includes an unlicensed communications signal path 420U(1)-420U(P) configured to receive the unlicensed downlink RF communications signals 406U(D) from the respective downlink communications interfaces 416D(1)-416D(P) for processing and to be routed through a receiver 422(1)-422(P) to the antenna 418(1)-418(P). The unlicensed communications signal paths 420U(1)-420U(P) are also configured to receive the unlicensed uplink RF communications signals 406U(U)(1)-406U(U)(P) from the antenna 418(1)-418(P) to be processed and routed to the respective uplink communications interfaces 416U(1)-416U(P) in the remote units 404(1)-404(P). In this example, the unlicensed communications signal paths 420U(1)-420U(P) are each comprised of separate respective unlicensed downlink communications signal paths 420U(D)(1)-420U(D)(P) and unlicensed uplink communications signal paths 420U(U)(1)-420U(U)(P) configured to receive and route respective unlicensed downlink RF communications signals 406U(D) and unlicensed uplink RF communications signals 406U(U)(1)-406U(U)(P) in the respective remote units 404(1)-404(P).

With continuing reference to FIG. 4, the unlicensed uplink communications signal paths 420U(U)(1)-420U(U)(P) each contain respective uplink signal path control circuits 424U(1)-424U(P). The uplink signal path control circuits 424U(1)-424U(P) are configured to be selectively controlled by respective remote unit controllers 426(1)-426(P) to enable and disable the respective unlicensed uplink communications signal paths 420U(U)(1)-420U(U)(P), and thus enable and disable communication of the unlicensed downlink RF communications signals 406U(D) in the remote units 404(1)-404(P). Also in this example, the unlicensed downlink communications signal paths 420U(D)(1)-420U(D)(P) contain respective downlink signal path control circuits 424D(1)-424D(P). The downlink signal path control circuits 424D(1)-424D(P) can also be configured, if desired, to be selectively controlled by the respective remote unit controllers 426(1)-426(P) to enable and disable the respective unlicensed downlink communications signal paths 420U(D)(1)-420U(D)(P), and thus enable and disable communication of the unlicensed downlink RF communications signals 406U(D) in the remote units 404(1)-404(P). In this regard, the remote unit controllers 426(1)-426(P) are configured to generate uplink and/or downlink commands 428(1)-428(P) to the respective uplink signal path control circuits 424U(1)-424U(P) and/or the downlink signal path control circuits 424D(1)-424D(P) to disable and enable the respective unlicensed uplink communications signal paths 420U(U)(1)-420U(U)(P) and unlicensed downlink communications signal paths 420U(D)(1)-420U(D)(P).

With continuing reference to FIG. 4, in this example, the remote unit controllers 426(1)-426(P) are configured to monitor the unlicensed communications signals (or spectrum) in unlicensed uplink communications signal paths 420U(U)(1)-420U(U)(P) and/or unlicensed downlink communications signal paths 420U(D)(1)-420U(D)(P) (the unlicensed communications signal paths 420). The monitoring of the unlicensed communications signals can be used to determine the unlicensed signal activity level to be taken into consideration for throughput considerations due to the source transceiver 408 transmitting unlicensed downlink communications signals 406U(D)(1)-406U(D)(P). For example, the receivers 422(1)-422(P) may include sensors that are configured to monitor the received unlicensed uplink RF communications signals 406U(U)(1)-406U(U)(P) in the respective unlicensed uplink communications signal paths 420U(U)(1)-420U(U)(P). The remote unit controllers 426(1)-426(P) are configured to determine unlicensed signal activity in the respective unlicensed uplink communications signal paths 420U(U)(1)-420U(U)(P) and/or unlicensed downlink communications signal paths 420U(D)(1)-420U(D)(P) in this example. The remote unit controllers 426(1)-426(P) can then be configured to selectively control the uplink signal path control circuits 424U(1)-424U(P) to disable the unlicensed uplink communications signal paths 420U(U)(1)-420U(U)(P) based on the determined unlicensed signal activity of the unlicensed communications signals exceeding a defined signal activity level.

For example, in the unlicensed uplink communications signal paths 420U(U)(1)-420U(U)(P), the uplink signal path control circuits 424U(1)-424U(P) may be electrical uplink signal path switches 430U(1)-430U(P). In this example, the remote unit controllers 426(1)-426(P) can also be configured to selectively control the downlink signal path control circuits 424D(1)-424D(P) to disable the unlicensed downlink communications signal paths 420U(D)(1)-420U(D)(P) based on the determined unlicensed signal activity exceeding a defined signal activity level. For example, the downlink signal path control circuits 424D(1)-424D(P) may also be electrical downlink signal path switches 430D(1)-430D(P). In this manner, when the unlicensed signal activity exceeds a defined signal activity level, the distribution of unlicensed RF communications signals 406U from the remote units 404(1)-404(P) can be controlled and disabled to allow the source transceiver 408 to transmit unlicensed downlink RF communications signals 406U(D) with reduced or avoided interference, and without long periods of silence. Note however that in this example, only the unlicensed uplink communications signal paths 420U(U)(1)-420U(U)(P) may be disabled.

Eventually, in this example, the unlicensed signal activity of the unlicensed communications signals in the unlicensed uplink communications signal paths 420U will no longer exceed the defined signal activity level in a given remote unit 404(1)-404(P). In this regard, the respective remote unit controllers 426(1)-426(P) are configured to selectively control the uplink and/or downlink signal path control circuits 424U(1)-424U(P), 424D(1)-424D(P) to enable the unlicensed uplink communications signal paths 420U(U)(1)-420U(U)(P) and/or unlicensed downlink communications signal paths 420U(D)(1)-420U(D)(P) based on the determined unlicensed signal activity in the unlicensed communications signal paths 420 not exceeding the defined signal activity level. Thus, the remote units 404(1)-404(P) are each individually configured to enable and disable the unlicensed uplink communications signal paths 420U(U)(1)-420U(U)(P) and/or unlicensed downlink communications signal paths 420U(D)(1)-420U(D)(P) based on the unlicensed signal activity in the unlicensed communications signal path 420 in their respective remote units 404(1)-404(P). This is further exemplified by the exemplary process 500 in FIG. 5.

Figure 5:
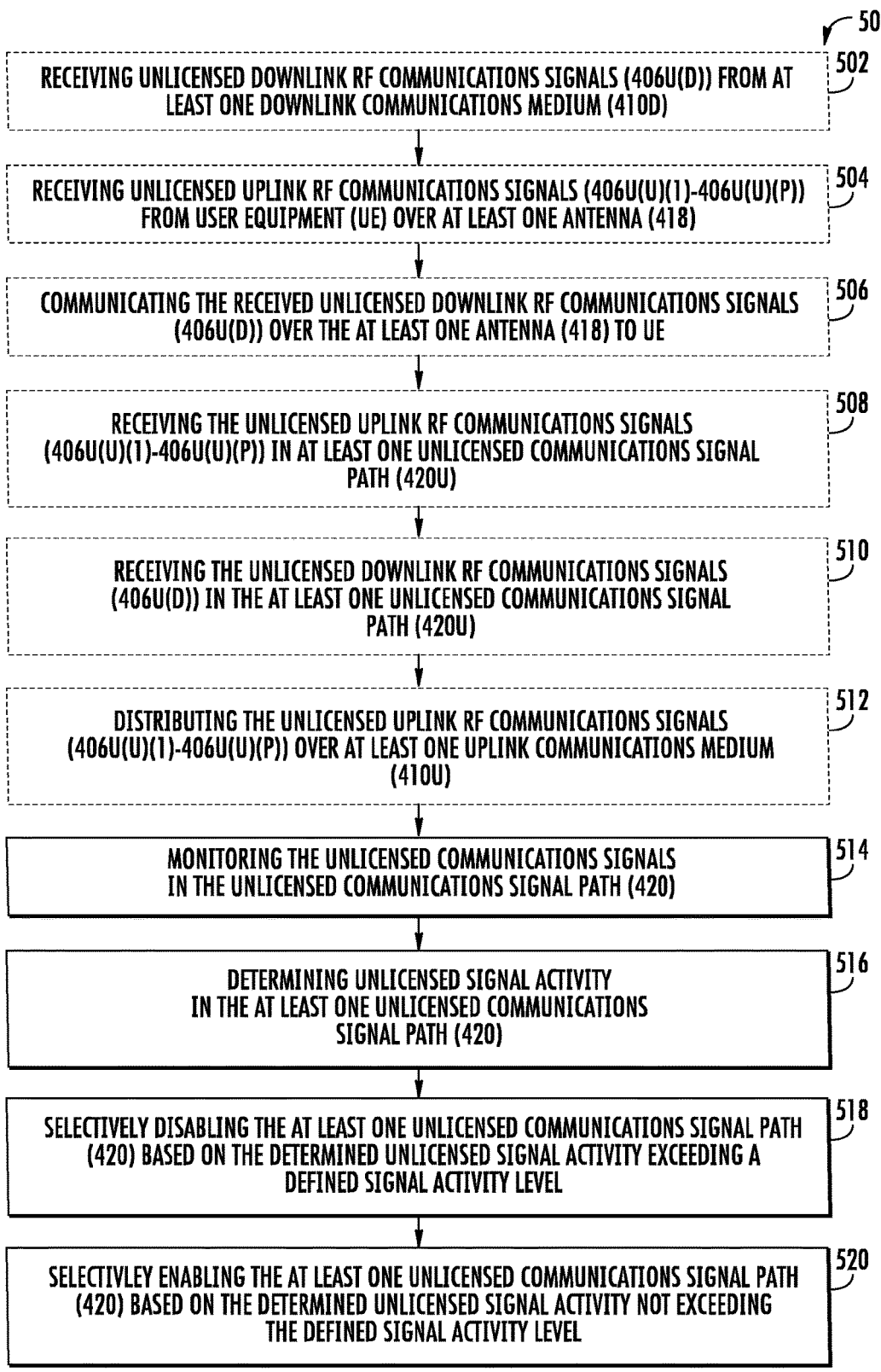
FIG. 5 is a flowchart illustrating an exemplary process for local control of an unlicensed communications signal path(s) in a remote unit in FIG. 4 based on monitored communications signal activity in unlicensed spectrum in the unlicensed communications signal path(s) in the remote unit.

With reference to FIG. 5, the process of selectively controlling distribution of unlicensed communications signals in a remote unit 404 in the DCS 400 in FIG. 4 can include receiving unlicensed downlink RF communications signals 406U(D) from the downlink communications medium 410D (block 502). Unlicensed uplink RF communications signals 406U(U) are received from a UE over an antenna(s) 418 (block 504). The process 500 further includes communicating the received unlicensed downlink RF communications signals 406U(D) over the antenna 418 to UE (block 506). The process 500 further includes receiving the unlicensed uplink RF communications signals 406U(U) in the unlicensed communications signal path 420 (block 508). The process 500 further includes receiving the unlicensed downlink RF communications signals 406U(D) in the unlicensed communications signal path 420 (block 510). The process 500 further includes distributing the unlicensed uplink RF communications signals 406U(U) over the uplink communications medium 410U (block 512).

The process 500 further includes monitoring the unlicensed communications signals in the unlicensed communications signal path 420 (block 514). The process 500 further includes a remote unit controller 426 determining unlicensed signal activity in the unlicensed communications signal path 420 (block 516). The process 500 further includes the remote unit controller 426 selectively disabling the unlicensed communications signal path 420 based on the determined unlicensed signal activity in the unlicensed communications signal path 420 exceeding a defined signal activity level (block 518). When the unlicensed signal activity in the unlicensed communications signal path 420 no longer exceeds the defined signal activity level (block 518), the process 500 can include the remote unit controller 426 selectively enabling the unlicensed communications signal path 420 based on the determined unlicensed signal activity in the unlicensed communications signal path 420 not exceeding the defined signal activity level (block 520).

With reference back to FIG. 4, there are different ways in which unlicensed signal activity in the unlicensed communications signal path 420 can be monitored or detected. As one example, the remote unit controllers 426(1)-426(P) may be configured to monitor unlicensed channels in the respective unlicensed communications signal paths 420. For example, only certain channels within a given frequency band or spectrum may be of interest to be used for transmission of unlicensed downlink RF communications signals 406U(D) by a source transceiver 408. In this regard, only unlicensed RF communications signals that occupied the channels of interest may be of concern to avoid interference between the source transceiver 408 and the unlicensed downlink RF communications signals 406U(D) transmitted to the remote units 404(1)-404(P). In this regard, in this example, the remote unit controllers 426(1)-426(P) can be configured to determine unlicensed channel activity of particular channels of interest in the respective unlicensed communications signal paths 420. The remote unit controllers 426(1)-426(P) can then selectively control uplink and/or downlink signal path control circuits 424U(1)-424U(P), 424D(1)-424D(P) to disable the unlicensed uplink communications signal paths 420U(U)(1)-420U(U)(P) and optionally, the unlicensed downlink communications signal paths 420U(D)(1)-420U(D)(P) based on the determined unlicensed channel activity exceeding a defined activity level for the channels of interest. When the channel activity of the channels of interest in the unlicensed communications signal path 420 no longer exceeds the defined uplink activity level, the remote unit controllers 426(1)-426(P) can then selectively control their respective uplink and/or downlink signal path control circuits 424U(1)-424U(P), 424D(1)-424D(P) to enable the unlicensed uplink communications signal paths 420U(U)(1)-420U(U)(P) and/or the unlicensed downlink communications signal paths 420U(D)(1)-420U(D)(P), if applicable.

In another example, the remote unit controllers 426(1)-426(P) may be configured to monitor the unlicensed signal occupancy rate in respective unlicensed communications signal paths 420. For example, if the unlicensed RF communications signals only occupy the frequency band or channels of interest for a limited occupancy rate meaning a certain period of time without a defined time frame, the source transceiver 408 may be able to transmit unlicensed downlink communications RF signals 406U(D) without interference or with acceptable levels of interference. However, if the unlicensed RF communications signals occupy the frequency band or channels of interest for a higher occupancy rate, the source transceiver 408 may not be able to transmit unlicensed downlink communications RF signals 406U(D) without interference beyond acceptable levels. In this regard, in this example, the remote unit controllers 426(1)-426(P) can be configured to determine unlicensed signal occupancy rate of the unlicensed RF communications signals in the respective unlicensed communications signal paths 420U. The remote unit controllers 426(1)-426(P) can then selectively control uplink and/or downlink signal path control circuits 424U(1)-424U(P), 424D(1)-424D(P) to disable the unlicensed uplink communications signal paths 420U(U)(1)-420U(U)(P) and optionally, the unlicensed downlink communications signal paths 420U(D)(1)-420U(D)(P), based on the determined unlicensed signal occupancy rate exceeding a defined unlicensed signal occupancy rate. When the channel activity of the channels of interest in the unlicensed communications signal path 420 no longer exceeds the defined unlicensed signal occupancy rate, the remote unit controllers 426(1)-426(P) can then selectively control their respective uplink and/or downlink signal path control circuits 424U(1)-424U(P), 424D(1)-424D(P) to enable the unlicensed uplink communications signal paths 420U(U)(1)-420U(U)(P) and/or the unlicensed downlink communications signal paths 420U(D)(1)-420U(D)(P), if applicable.

The examples discussed above with regard to the DCS 400 in FIG. 4 involve the remote unit controllers 426(1)-426(P) providing local unlicensed RF communication signals control based only on communications signal activity of their respective unlicensed communications signal paths 420. However, uplink communications signal activity in each of remote units 404(1)-404(P) collectively can affect source transceiver 408 transmission of unlicensed downlink RF communications signals 406U(D). For example, the communications signal activity in one remote unit 404 may be considered high, but the communications signal activity in the other remote units 404(1)-404(P) may be considered low. Thus, the collective communications signal activity in the remote units 404(1)-404(P) may be considered low and acceptable from the perspective of the source transceiver 408 even though the communications signal activity in one remote unit 404 is higher. But, the remote unit controllers 426(1)-426(P) in the DCS 400 in FIG. 4 are only configured to provide localized control of unlicensed uplink communications signal paths 420U(U)(1)-420U(U)(P) and/or the unlicensed downlink communications signal paths 420U(D)(1)-420U(D)(P) based only on communications signal activity within its respective remote unit 404(1)-404(P).

In this regard, the DCS 400 in FIG. 4 also includes an optional central controller 432. The central controller 432 can be provided separate from the central unit 402 or integrated in the central unit 402 and/or as part of the functionality of the central unit 402. The central controller 432 is configured to receive unlicensed signal reports 434(1)-434(P) from each of the remote units 404(1)-404(P) indicating the communications signal activity within the remote units 404(1)-404(P). In this regard, the remote unit controllers 426(1)-426(P) are configured to monitor the unlicensed communications signal paths 420U. The remote unit controllers 426(1)-426(P) are configured to monitor and communicate respective unlicensed signal reports 434(1)-434(P) in the unlicensed communications signal paths 420 to the central controller 432 over communications links 436(1)-436(P). Local modems 438(1)-438(P) may be provided to interface with the remote unit controllers 426(1)-426(P) to communicate the unlicensed uplink RF communications signals 406U(U)(1)-406U(U)(P) to the central controller 432. The communications links 436(1)-436(P) may be dedicated links or provided as part of the downlink and/or uplink communications medium 410D(1)-410D(P), 410U(1)-410U(P).

In response, the central controller 432 is configured to receive the unlicensed signal reports 434(1)-434(P) from each of the remote units 404(1)-404(P). The central controller 432 is then configured to determine unlicensed signal activity for the remote units 404(1)-404(P) based on the received unlicensed signal reports 434(1)-434(P) from the remote units 404(1)-404(P). Based on the determined unlicensed signal activity for the remote units 404(1)-404(P), the central controller 432 is configured to selectively communicate an unlicensed disable command to selected remote unit controllers 426(1)-426(P) to cause the selected remote unit controller 426(1)-426(P) to cause the uplink signal path control circuits 424U(1)-424U(P) and/or the downlink signal path control circuits 424D(1)-424D(P) to disable the selected unlicensed uplink communications signal paths 420U(U)(1)-420U(U)(P) and/or unlicensed downlink communications signal paths 420U(D)(1)-420U(D)(P). The central controller 432 can send the unlicensed disable command to selected remote unit controllers 426(1)-426(P) based on the aggregate unlicensed signal activity in the remote units 404(1)-404(P). In response, the remote unit controllers 426(1)-426(P) of the selected remote units 404(1)-404(P) selectively control the uplink signal path control circuits 424U(1)-424U(P) and/or the downlink signal path control circuits 424D(1)-424D(P) to disable the selected unlicensed uplink communications signal paths 420U(U)(1)-420U(U)(P) and/or unlicensed downlink communications signal paths 420U(D)(1)-420U(D)(P), in response to receipt of an unlicensed disable command from the central controller 432. The central controller 432 can also send an unlicensed enable command to selected remote unit controllers 426(1)-426(P) based on the aggregate unlicensed signal activity in the remote units 404(1)-404(P), to cause the selected remote unit controllers 426(1)-426(P) to enable the selected unlicensed uplink communications signal paths 420U(U)(1)-420U(U)(P) and/or unlicensed downlink communications signal paths 420U(D)(1)-420U(D)(P). This is further exemplified by the exemplary process 600 in FIG. 6.

Figure 6:
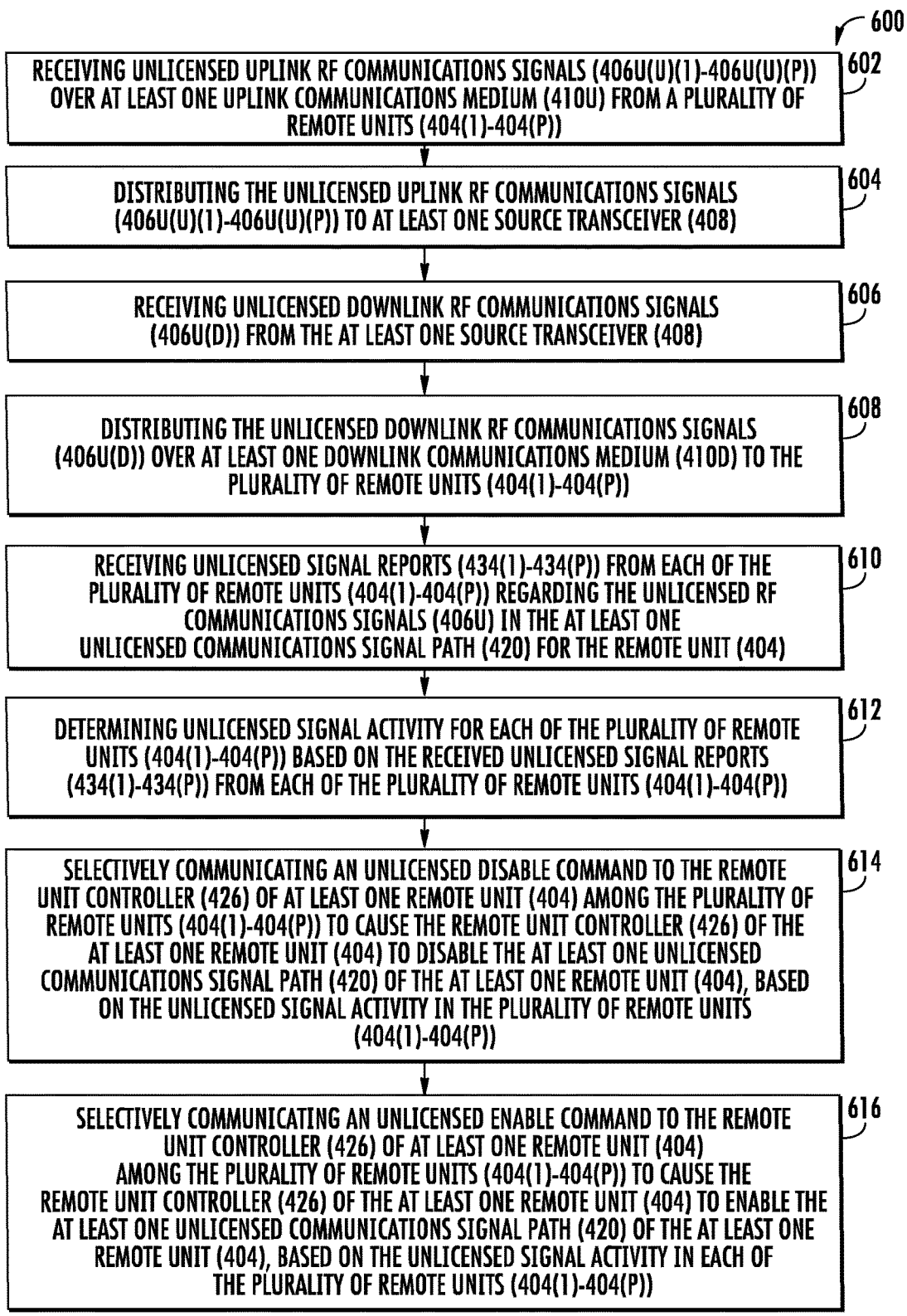
FIG. 6 is a flowchart illustrating an exemplary process for centralized control of unlicensed communications signal path(s) in the remote units in the DCS in FIG. 4 based on monitored communications signal activity in unlicensed spectrum in the unlicensed communications signal paths in the remote units.

With reference to FIG. 6, the process 600 includes receiving unlicensed uplink RF communications signals 406U(U)(1)-406U(U)(P) over the uplink communications medium 410U from the remote units 404(1)-404(P) (block 602). The process 600 also includes distributing the unlicensed uplink RF communications signals 406U(U)(1)-406U(U)(P) to the source transceiver 408 (block 604). The process 600 also includes receiving unlicensed downlink RF communications signals 406U(D) from the source transceiver 408 (block 606). The process 600 also includes distributing the unlicensed downlink RF communications signals 406U(D) over the downlink communications medium 410D to the remote units 404(1)-404(P) (block 608). The process 600 also includes receiving an unlicensed signal report 434(1)-434(P) from each of the remote units 404(1)-404(P) in the unlicensed communications signal path 420 for the remote unit 404 (block 610). The process 600 also includes the central controller 432 determining unlicensed signal activity for each of the remote units 404(1)-404(P) based on the received unlicensed signal reports 434(1)-434(P) from the remote units 404(1)-404(P) (block 612). The process 600 also includes selectively communicating an unlicensed disable command to the remote unit controller 426 of remote unit 404 among the remote units 404(1)-404(P) to cause the remote unit controller 426 to disable the unlicensed communications signal path 420U of the remote unit 404, based on the unlicensed signal activity in the remote units 404(1)-404(P) (block 614). Once the unlicensed signal activity in the remote units 404(1)-404(P) is such that the unlicensed communications signal path 420 of the remote unit 404 can be enabled, the process 600 includes the central controller 432 selectively communicating an unlicensed enable command to the remote unit controller 426 of the remote unit 404 among the remote units 404(1)-404(P) to cause the remote unit controller 426 of the remote unit 404 to enable the unlicensed communications signal path 420 of the remote unit 404, based on the unlicensed signal activity in the remote units 404(1)-404(P) (block 616).

With reference back to FIG. 4, there are different ways in which aggregate unlicensed signal activity in the unlicensed communications signal paths 420 can be monitored or detected. For example, the central controller 432 can be configured to selectively communicate the unlicensed disable command to the remote unit controllers 426(1)-426(P) of the selected remote units 404(1)-404(P) based on the determined unlicensed signal activity in a particular remote unit 404 exceeding a defined signal activity level. For example, regardless of the aggregate unlicensed signal activity in the remote units 404(1)-404(P), if the signal activity level in a particular remote unit 404 is higher than a defined signal activity level acceptable for even one (1) remote unit 404(1)-404(P), the central controller 432 can instruct that remote unit 404 to disable unlicensed RF communication signal activity. The central controller 432 can also selectively communicate the unlicensed enable command to the remote unit controllers 426(1)-426(P) of the selected remote units 404(1)-404(P), based on the determined unlicensed signal activity in the selected remote unit 404 no longer exceeding the defined signal activity level.

In another example, the central controller 432 can be configured to determine an aggregate unlicensed signal activity in the unlicensed communications signal paths 420 in each of remote units 404(1)-404(P) based on the received unlicensed signal report 434(1)-434(P) from remote units 404(1)-404(P). The central controller 432 can be configured to then selectively communicate an unlicensed disable command to the remote unit controller 426(1)-426(P) of the selected remote unit 404(1)-404(P), based on the determined aggregate unlicensed signal activity exceeding a defined signal activity level. The central controller 432 can be further configured to selectively communicate the unlicensed enable command to the remote unit controller 426(1)-426(P) of the selected remote unit 404(1)-404(P) to enable unlicensed communications based on the determined aggregate unlicensed channel activity not exceeding the defined channel activity level.

In another example, the central controller 432 can be configured to selectively communicate the unlicensed disable command to the remote unit controller 426(1)-426(P) of a remote unit 404(1)-404(P) based on the unlicensed signal activity of the remote unit 404(1)-404(P) exceeding a defined channel activity contribution level to the aggregate unlicensed channel activity.

Figure 7:
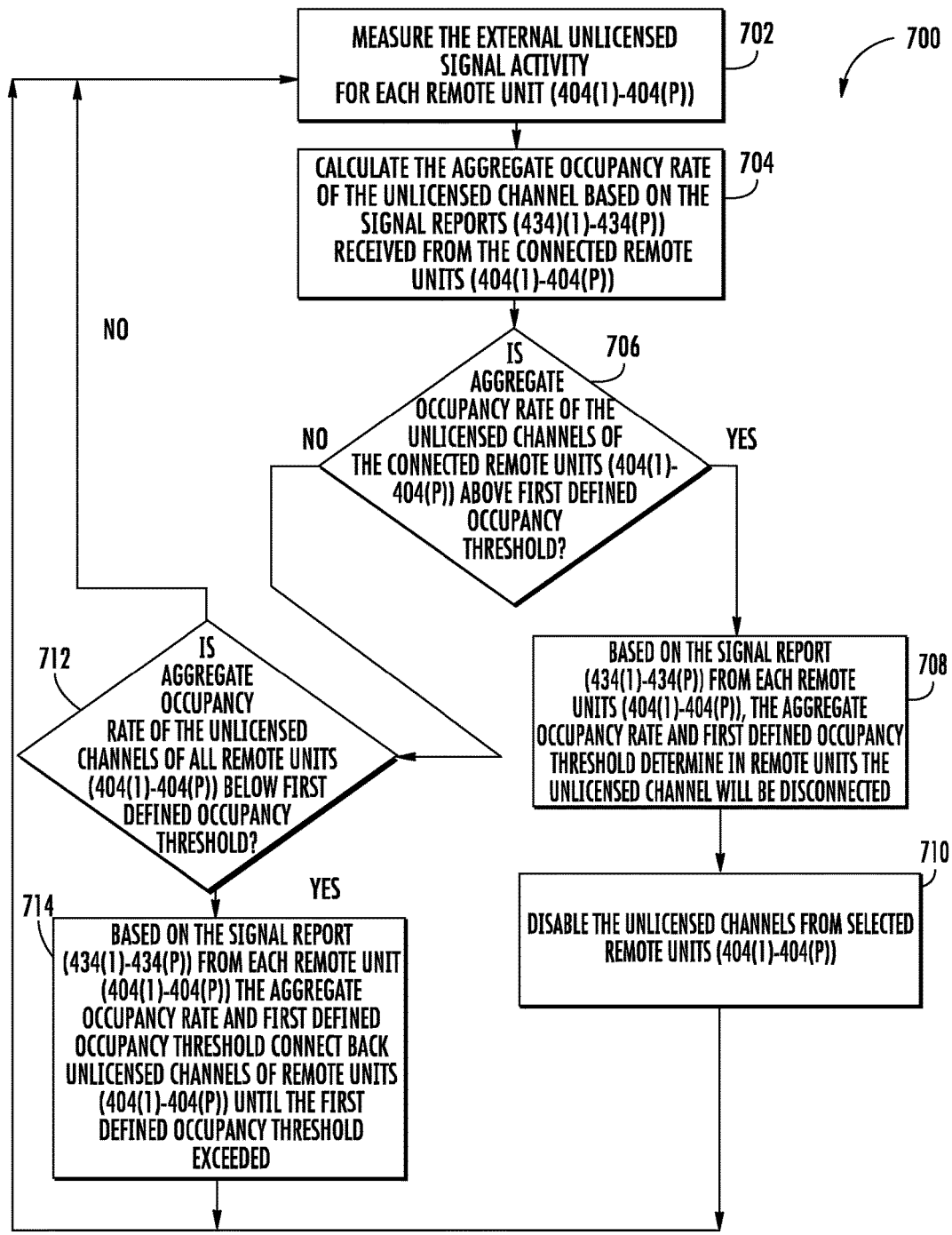
FIG. 7 is a flowchart illustrating another exemplary process for centralized control of unlicensed communications signal paths in the remote units in the DCS in FIG. 4 based on an aggregate communications signal activity in unlicensed spectrum in the unlicensed communications signal paths in the remote units.

In yet another example, the central controller 432 can be configured to determine an aggregate unlicensed channel occupancy of at least one unlicensed RF communications channel in the in the unlicensed communications signal paths 420 in the remote units 404(1)-404(P) based on the received unlicensed signal report 434(1)-434(P) from the remote units 404(1)-404(P). The central controller 432 can selectively communicate the unlicensed disable command to the remote unit controller 426(1)-426(P) of the remote unit 404(1)-404(P) that has an aggregate unlicensed channel occupancy exceeding a defined threshold unlicensed channel occupancy. The central controller 432 can selectively communicate the unlicensed enable command to the remote unit controller 426(1)-426(P) of the remote unit 404(1)-404(P) that has an aggregate unlicensed channel occupancy not exceeding the defined threshold unlicensed channel occupancy. FIG. 7 is a flowchart that illustrates such an exemplary process 700.

In this regard, the process 700 includes the central controller 432 measuring or monitoring the unlicensed signal activity in the unlicensed uplink communications signal paths 420U the remote units 404(1)-404(P) based on the unlicensed signal reports 434(1)-434(P), as previously described (block 702). Note that this exemplary process is not limited to monitoring the unlicensed signal activity in the unlicensed uplink communications signal paths 420U, but could also include monitoring of the unlicensed signal activity in the unlicensed downlink communications signal paths 420D. The central controller 432 calculates the aggregate occupancy rate of the unlicensed channels in the in the unlicensed uplink communications signal paths 420U based on the unlicensed signal reports 434(1)-434(P) (block 704). The central controller 432 determines if the aggregate occupancy rate of the unlicensed channels in the in the unlicensed uplink communications signal paths 420U for the connected remote units 404(1)-404(P) is above a first defined occupancy threshold (block 706). For example, FIG. 8 shows an exemplary aggregate occupancy rate of unlicensed channels in the unlicensed uplink communications signal paths 420U of 20.4% for five (5) remote units 404(1)-404(5). Note that the aggregate occupancy rate of unlicensed channels in the in the unlicensed uplink communications signal path 420U is not a mere summing of the individual occupancy rates of the remote units 404(1)-404(5) (i.e., 7%, 5%, 15%, 10%, and 4%), because the antenna coverage areas of certain of the remote units 404(1)-404(5) may overlap such that unlicensed RF communications signals 406U are received by multiple of the remote units 404(1)-404(P).

If the central controller 432 determines the aggregate occupancy rate of the unlicensed channels in the in the unlicensed uplink communications signal paths 420U for the connected remote units 404(1)-404(P) is above a first defined occupancy threshold, based on the unlicensed signal reports 434(1)-434(P) from each remote unit 404(1)-404(P), the central controller 432 determines which remote units 404(1)-404(P) have an occupancy such that the unlicensed communications signal activity in such remote unit 404(1)-404(P) should be disabled (block 708). The remote units 404(1)-404(P) selected for disabling unlicensed communications signal activity are instructed by the central controller 432 to disable their unlicensed communications signal activity, as previously discussed (block 710). If however at block 706, the central controller 432 determines that aggregate occupancy rate of the unlicensed channels in the in the unlicensed uplink communications signal paths 420U for the connected remote units 404(1)-404(P) does not exceed the first defined occupancy threshold, the central controller 432 determines if the aggregated occupancy rate of the unlicensed channels in the unlicensed uplink communications signal paths 420U is below the first defined occupancy threshold (block 712). If so, based on the unlicensed signal reports 434(1)-434(P) from the remote units 404(1)-404(P), the aggregated occupancy rate of the unlicensed channels in the unlicensed uplink communications signal paths 420U does not exceed the first defined occupancy threshold, the central controller 432 instructs the selected remote units 404(1)-404(P) to enable their unlicensed communications signal activity, as previously discussed (block 714).

Note that in the above examples, that when monitoring of the unlicensed uplink communications signal paths 420U is discussed, such monitoring can include the monitoring of unlicensed uplink RF communications signals 406U(U)(1)-406U(U)(P) only, the unlicensed downlink RF communications signals 406U(D)(1)-406U(D)(P) only, or both the unlicensed uplink RF communications signals 406U(U)(1)-406U(U)(P) and the unlicensed downlink RF communications signals 406U(D)(1)-406U(D)(P) only. Further, all or a subset of the unlicensed uplink communications signal paths 420U(U)(1)-420U(U)(P) may be monitored in any of these above discussed scenarios, and in any combination. Further, when enabling and disabling unlicensed communications signal paths is discussed above, such can include the enabling and disabling of the unlicensed uplink communications signal paths 420U(U)(1)-420U(U)(P) only, the unlicensed downlink communications signal paths 420U(D)(1)-420U(D)(P) only, or both the unlicensed uplink communications signal paths 420U(U)(1)-420U(U)(P) and the unlicensed downlink communications signal paths 420U(D)(1)-420U(D)(P) only. Further, all or a subset of the unlicensed communications signal paths 420U(1)-420U(P) may be disabled and enabled for any of these above discussed scenarios, and in any combination.

Figure 9:
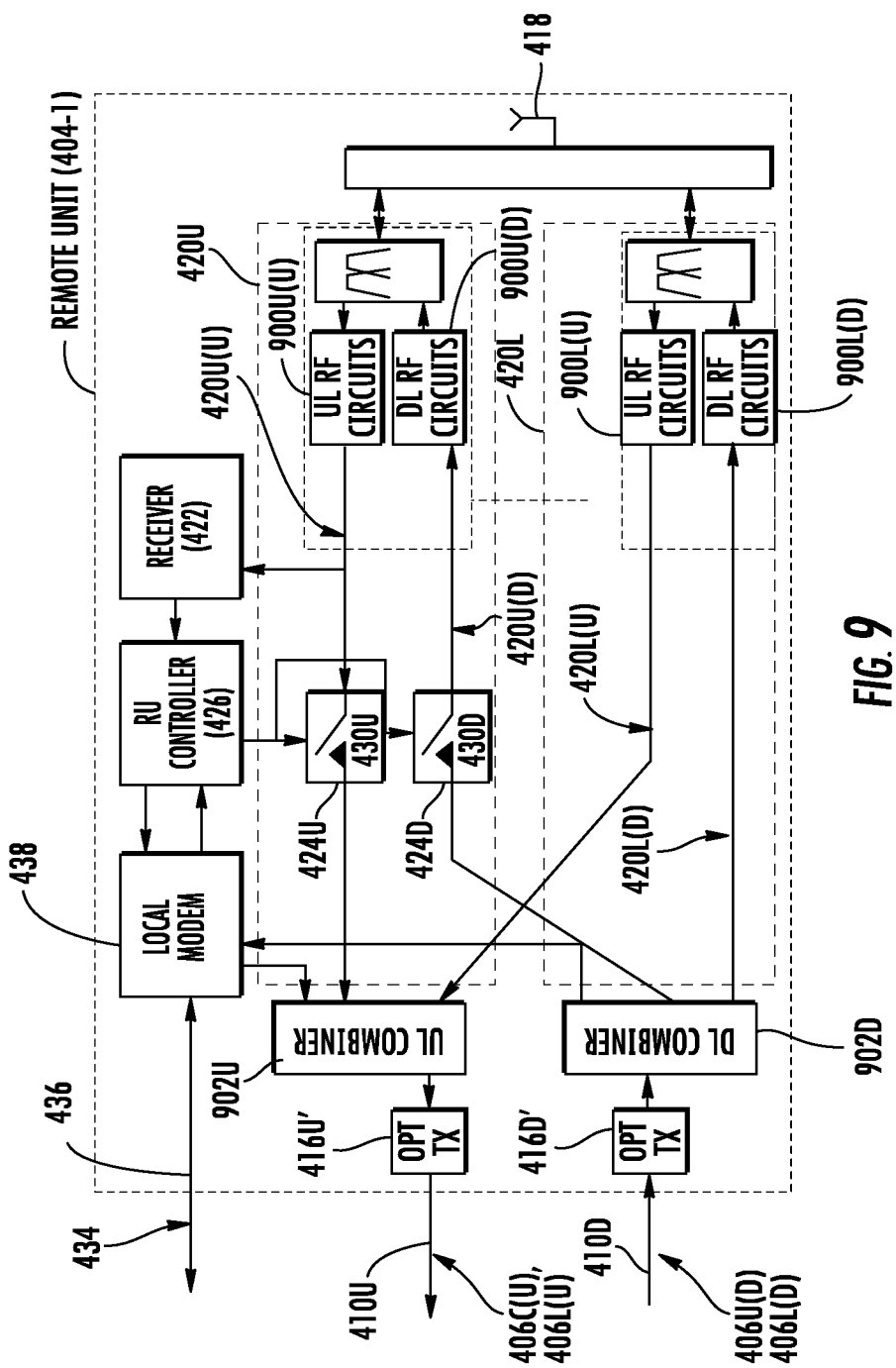
FIG. 9 is a schematic diagram of an exemplary remote unit that can be provided in the DCS of FIG. 4, illustrating licensed and unlicensed communications signal paths directed to licensed band circuits and unlicensed band circuits, respectively, and respective switching mechanisms configured to be controlled to disable or disconnect the licensed and unlicensed communications signal path(s) in the remote unit.

Note that it is also possible to provide for the remote units 404(1)-404(P) in the DCS 400 in FIG. 4 to also support licensed communication services. In this regard, FIG. 9 is an exemplary remote unit 404-1 that is similar to a remote unit 404 in the DCS 400 in FIG. 4. The remote unit 404-1 can be employed as any of the remote units 404(1)-404(P) in FIG. 4. Common components between the remote unit 404-1 and the remote units 404(1)-404(P) in FIG. 4 are shown with common element numbers and will not be re-described.

With reference to FIG. 9, a downlink communications interface 416D' is provided that is configured to receive both licensed downlink RF communications signals 406L(D) and the unlicensed downlink RF communications signals 406U(D) from the downlink communications medium 410D. In this example, the downlink communications interface 416D' is a downlink optical communications interface with the downlink communications medium 410D being a downlink optical communications medium. The remote unit 404-1 includes the antenna 418 that is configured to receive licensed uplink RF communications signals 406L(U) from UE, and communicate the received licensed downlink RF communications signals 406L(D) to UE. The antenna 418 may include a multi-band antenna or multiple antennas to support the desired licensed and unlicensed frequency bands. The remote unit 404-1 also includes a licensed communications signal path 420L that is configured to receive the licensed uplink RF communications signals 406L(U) and the licensed downlink RF communications signals 406L(D). An uplink communications interface 416U' is configured to receive the unlicensed uplink RF communications signals 406U(U) and the licensed uplink RF communications signals 406L(U) for coupling to the uplink communications medium 410U. In this example, the uplink communications interface 416U' is an uplink optical communications interface with the uplink communications medium 410U being an uplink optical communications medium.

With continuing reference to FIG. 9, in this example, the licensed communications signal path 420L is comprised of a licensed uplink communications signal path 420L(U)

configured to receive the licensed uplink RF communications signals 406L(U), and a licensed downlink communications signal path 420L(D) configured to receive the licensed downlink RF communications signals 406L(D). The licensed uplink communications signal path 420L(U) includes one or more licensed uplink band circuits 900L(U) configured to process the received licensed uplink RF communications signals 406L(U). The licensed downlink communications signal path 420L(D) includes one or more licensed downlink band circuits 900L(D) configured to process the received licensed downlink RF communications signals 406L(D). Further, the unlicensed uplink communications signal path 420U(U) includes one or more unlicensed uplink band circuits 900U(U) configured to process the received unlicensed uplink RF communications signals 406U(U). The unlicensed downlink communications signal path 420U(D) includes one or more unlicensed downlink band circuits 900U(D) configured to process the received unlicensed downlink RF communications signals 406U(D).

An uplink combiner 902U is provided and configured to receive the unlicensed uplink RF communications signals 406U(U) from unlicensed uplink communications signal path 420U(U) and the licensed uplink RF communications signals 406L(U) from the licensed uplink communications signal path 420L(U), and combine these signals into combined uplink RF communications signals 406C(U). A downlink combiner 902D is also provided to receive the combined downlink RF communications signals comprising the licensed downlink RF communications signals 406L(D) and unlicensed downlink RF communications signals 406U(D), separate them out to provide the unlicensed downlink RF communications signals 406U(D) to the unlicensed downlink communications signal path 420U(D), and provide the licensed downlink RF communications signals 406L(D) to the licensed downlink communications signal path 420L(D).

Figure 10:
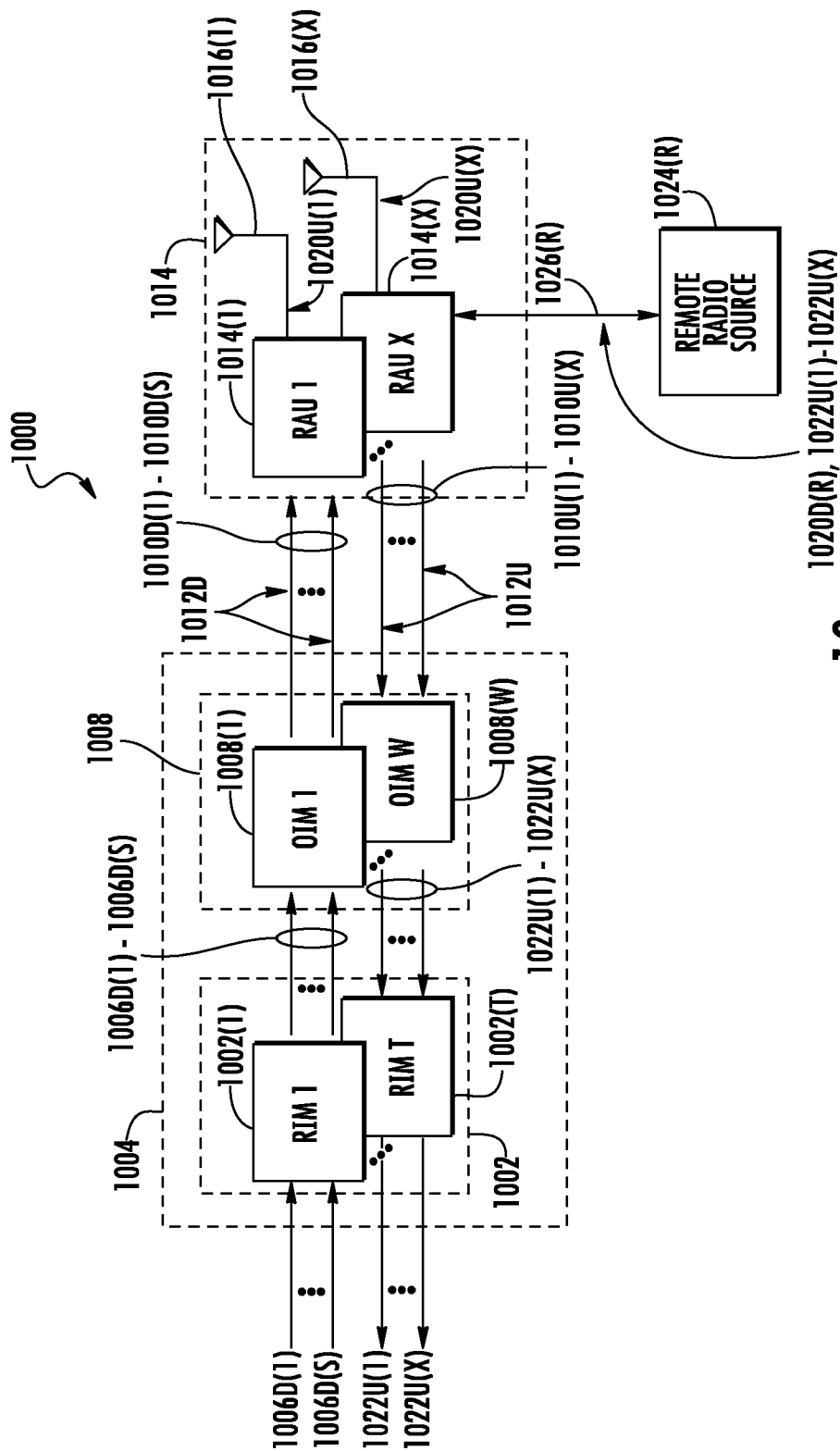
FIG. 10 is a schematic diagram of an exemplary DCS provided in the form of an optical fiber-based distributed antenna system (DAS) that includes a central unit configured to distribute communications signals over optical fiber to a plurality of remote units, wherein unlicensed communications signal paths in the remote units are configured to be disabled or disconnected to disable distribution of unlicensed communications signals based on monitored communications signal activity in unlicensed spectrum on the unlicensed communications signal path(s) in the remote units.
Figure 17:
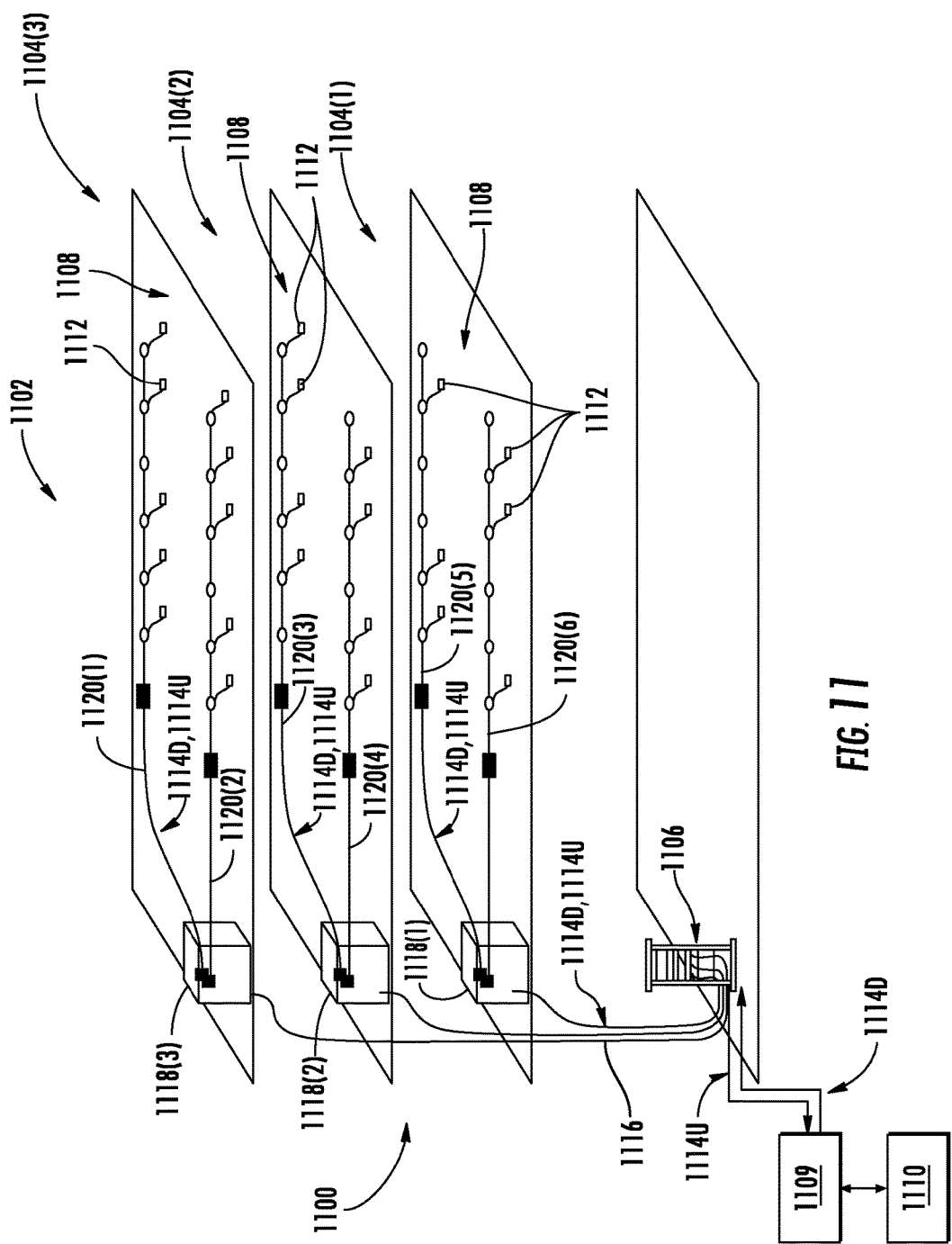

A DCS configured to selectively not distribute received unlicensed spectrum communications by remote units can be provided as a distributed antenna system (DAS). In this regard, FIG. 10 is a schematic diagram of exemplary DAS 1000. The DAS 1000 in this example is an optical fiber-based DAS. The DAS 1000 in this example is comprised of three (3) main components. One or more radio interfaces provided in the form of radio interface modules (RIMs) 1002(1)-1002(T) are provided in a central unit 1004 to receive and process downlink electrical communications signals 1006D(1)-1006D(S) prior to optical conversion into downlink optical communications signals. The downlink electrical communications signals 1006D(1)-1006D(S) may be received from a base station (not shown) as an example. The RIMs 1002(1)-1002(T) provide both downlink and uplink interfaces for signal processing. The notations "1-S" and "1-T" indicate that any number of the referenced component, 1-S and 1-T, respectively, may be provided.

With continuing reference to FIG. 10, the central unit 1004 is configured to accept the plurality of RIMs 1002(1)-1002(T) as modular components that can easily be installed and removed or replaced in the central unit 1004. In one embodiment, the central unit 1004 is configured to support up to twelve (12) RIMs 1002(1)-1002(12). Each RIM 1002(1)-1002(T) can be designed to support a particular type of radio source or range of radio sources (i.e., frequencies) to provide flexibility in configuring the central unit 1004 and the multi-frequency DAS 1000 to support the desired radio sources. For example, one RIM 1002 may be configured to support the Personal Communication Services (PCS) radio band. Another RIM 1002 may be configured to support the 700 MHz radio band. In this example, by inclusion of these RIMs 1002, the central unit 1004 could be configured to support and distribute unlicensed and/or licensed communications signals. Licensed communications signals could include both PCS and LTE 700 radio bands, as examples. Unlicensed communications signals could include WiFi signals as an example. RIMs 1002 may be provided in the central unit 1004 that support any licensed frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 1002(1)-1002(T) may also be provided in the central unit 1004 that support any wireless technologies desired, including but not limited to Code Division Multiple Access (CDMA), CDMA200, 1xRTT, Evolution-Data Only (EV-DO), UNITS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 1002(1)-1002(T) may be provided in the central unit 1004 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the downlink electrical communications signals 1006D(1)-1006D(S) are provided to a plurality of optical interfaces provided in the form of optical interface modules (OIMs) 1008(1)-1008(W) in this embodiment to convert the unlicensed and/or licensed downlink electrical communications signals 1006D(1)-1006D(S) ("downlink electrical communications signals 1006D(1)-1006D(S)") into downlink optical communications signals 1010D(1)-1010D(S). The notation "1-W" indicates that any number of the referenced component 1-W may be provided. The OIMs 1008 may be configured to provide one or more optical interface components (OICs) that contain optical-to-electrical (O-E) and electrical-to-optical (E-O) converters, as will be described in more detail below. The OIMs 1008 support the radio bands that can be provided by the RIMs 1002, including the examples previously described above.

The OIMs 1008(1)-1008(W) each include E-O converters to convert the downlink electrical communications signals 1006D(1)-1006D(S) into the downlink optical communications signals 1010D(1)-1010D(S). The downlink optical communications signals 1010D(1)-1010D(S) are communicated over downlink optical fiber communications medium 1012D to a plurality of remote units provided in the form of remote antenna units 1014(1)-1014(X. The notation "1-X" indicates that any number of the referenced component 1-X may be provided. O-E converters provided in the remote antenna units 1014(1)-1014(X) convert the downlink optical communications signals 1010D(1)-1010D(S) back into the downlink electrical communications signals 1006D(1)-1006D(S), which are provided to antennas 1016(1)-1016(X) in the remote antenna units 1014(1)-1014(X) to user equipment (not shown) in the reception range of the antennas 1016(1)-1016(X).

E-O converters are also provided in the remote antenna units 1014(1)-1014(X) to convert licensed and/or unlicensed uplink electrical communications signals 1020U(1)-1020U(X) ("uplink electrical communications signals 1020U(1)-1020U(X)") received from user equipment (not shown) through the antennas 1016(1)-1016(X) into uplink optical communications signals 1010U(1)-1010U(S). The remote antenna units 1014(1)-1014(X) communicate the uplink optical communications signals 1010U(1)-1010U(S) over an uplink optical fiber communications medium 1012U to the OIMs 1008(1)-1008(W) in the central unit 1004. The OIMs 1008(1)-1008(W) include O-E converters that convert the received uplink optical communications signals 1010U(1)-1010U(S) into uplink electrical communications signals 1022U(1)-1022U(X), which are processed by the RIMs 1002(1)-1002(T) and provided as uplink electrical communications signals 1022U(1)-1022U(X). The central unit 1004 may provide the uplink electrical communications signals 1022U(1)-1022U(X) to a source transceiver such as a base station or other communications system.

Note that the downlink optical fiber communications medium 1012D and uplink optical fiber communications medium 1012U connected to each remote antenna unit 1014(1)-1014(X) may be a common optical fiber communications medium, wherein for example, wave division multiplexing (WDM) may be employed to provide the downlink optical communications signals 1010D(1)-1010D(S) and the uplink optical communications signals 1010U(1)-1010U(S) on the same optical fiber communications medium.

With continuing reference to FIG. 10, the remote antenna unit 1014(X) is a radio source remote antenna unit. The remote antenna unit 1014(X) is directly communicatively coupled to a remote radio source 1024(R) through a direct communicative coupling 1026(R). The radio source remote antenna unit 1014(X) is configured to receive remote downlink communications signals 1020D(R) from the remote radio source 1024(R) to be distributed to one or more of other remote antenna units 1014(1)-1014(X−1). In this example, the radio source remote antenna unit 1014(X) distributes the received remote downlink communications signals 1020D(R) to the central unit 1004 to then be distributed to one or more other remote antenna units 1014(1)-1014(X−1). However, the radio source remote antenna unit 1014(X) could also be configured to distribute the received remote downlink communications signals 1020D(R) directly to one or more other remote antenna units 1014(1)-1014(X−1) in a daisy-chain configuration, if the remote antenna units 1014(1)-1014(X) in the DAS 1000 were configured in a daisy-chain configuration. All of the exemplary discussion above with regard to radio source remote units, remote radio sources, and DCSs can be applied to the example DAS 1000 in FIG. 10.

A DCS configured to selectively not distribute received unlicensed spectrum communications by remote units, such as DCS 400 in FIG. 4, may be provided in an indoor environment, such as illustrated in FIG. 11. In this regard, FIG. 11 is a partially schematic cut-away diagram of a building infrastructure 1100 employing a DAS 1102 configured to evaluate performance of remote units on a per remote unit basis, as described above. The building infrastructure 1100 in this embodiment includes a first (ground) floor 1104(1), a second floor 1104(2), and a third floor 1104(3). The floors 1104(1)-1104(3) are serviced by the central unit 1106 to provide the antenna coverage areas 1108 in the building infrastructure 1100. The central unit 1106 is communicatively coupled to a base station 1109 to receive downlink communications signals 1114D from the base station 1109. The base station 1109 may be coupled to an operational and support system (OSS) 1110 to receive data about the performance of remote antenna units 1112 in the DAS 1102 on a per remote unit basis for determining DAS optimizations. The central unit 1106 is communicatively coupled to the remote antenna units 1112 to receive uplink communications signals 1114U from the remote antenna units 1112, similar to as previously discussed above for other DASs. The downlink and uplink communications signals 1114D, 1114U communicated between the central unit 1106 and the remote antenna units 1112 are carried over a riser cable 1116 in this example. The riser cable 1116 may be routed through interconnect units (ICUs) 1118(1)-1118(3) dedicated to each floor 1104(1)-1104(3) that route the downlink and uplink communications signals 1114D, 1114U to the remote antenna units 1112 and also provide power to the remote antenna units 1112 via array cables 1120(1)-1120(6).

Figure 12:
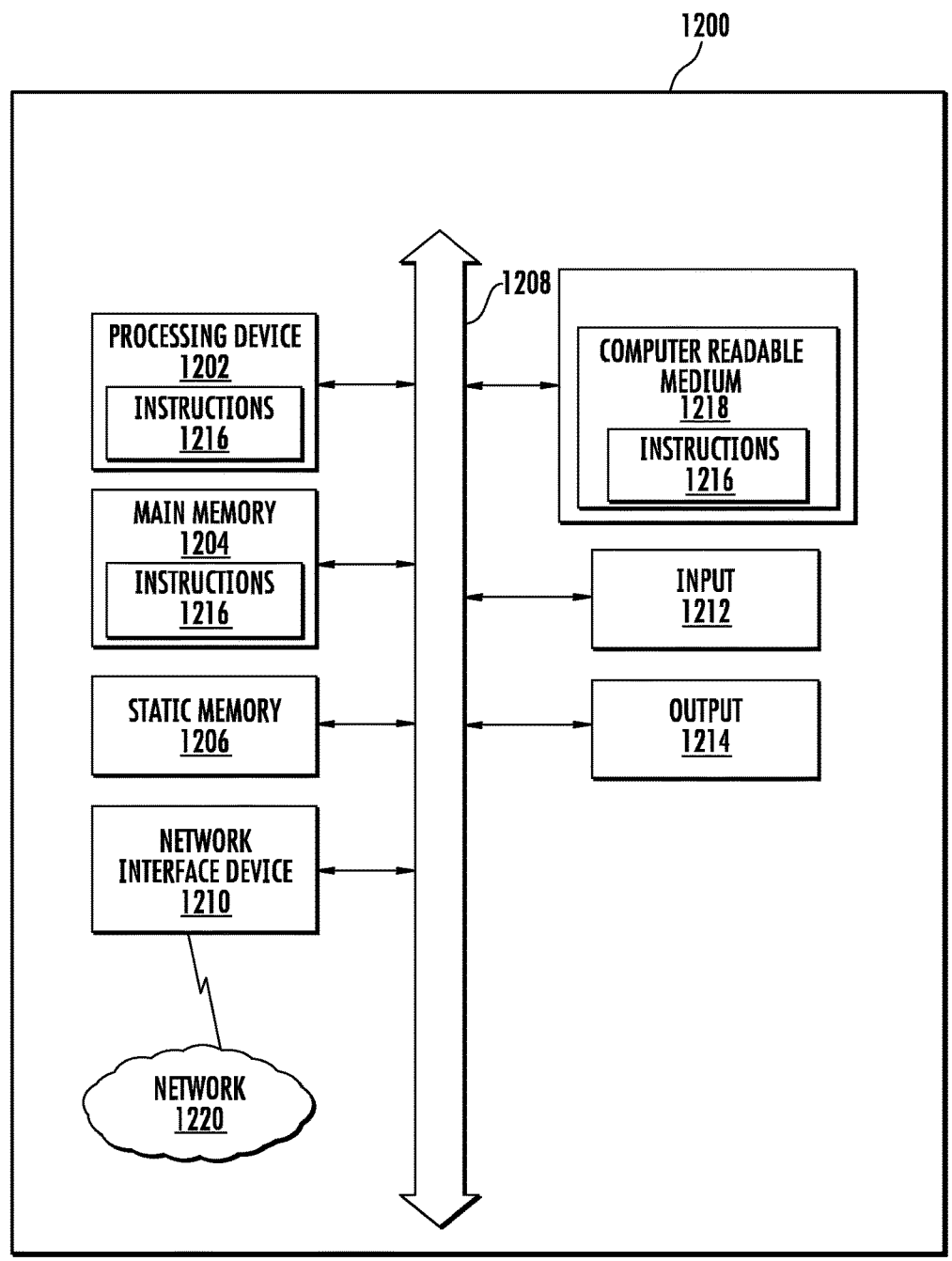
FIG. 12 is a schematic diagram of a generalized representation of an exemplary controller that can be included in any central unit or remote unit in a DCS, wherein the controller is configured to control disabling or disconnecting distribution of unlicensed communications signal paths in remote units to disable distribution of unlicensed communications signals based on monitored communications signal activity in unlicensed spectrum on the unlicensed communications signal path(s) in the remote units, wherein the exemplary computer system is adapted to execute instructions from an exemplary computer readable medium.

FIG. 12 is a schematic diagram representation of additional detail illustrating a computer system 1200 that could be employed in a controller, including the remote unit controller and/or the central controller described above in a DCS, for selectively not distributing received unlicensed spectrum communications by remote units. In this regard, the computer system 1200 is adapted to execute instructions from an exemplary computer-readable medium to perform these and/or any of the functions or processing described herein.

In this regard, the computer system 1200 in FIG. 12 may include a set of instructions that may be executed to predict frequency interference to avoid or reduce interference in a multi-frequency DAS. The computer system 1200 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1200 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1200 in this embodiment includes a processing device or processor 1202, a main memory 1204 (e.g., read-only memory (ROM), flash memory, dynamic random access memory (DRAM), such as synchronous DRAM (SDRAM), etc.), and a static memory 1206 (e.g., flash memory, static random access memory (SRAM), etc.), which may communicate with each other via a data bus 1208. Alternatively, the processor 1202 may be connected to the main memory 1204 and/or static memory 1206 directly or via some other connectivity means. The processor 1202 may be a controller, and the main memory 1204 or static memory 1206 may be any type of memory.

The processor 1202 represents one or more general-purpose processing devices, such as a microprocessor, central processing unit, or the like. More particularly, the processor 1202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1202 is configured to execute processing logic in instructions for performing the operations and steps discussed herein.

The computer system 1200 may further include a network interface device 1210. The computer system 1200 also may or may not include an input 1212, configured to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processor 1202 during execution thereof by the computer system 1200, the main memory 1204 and the processor 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for providing radio-frequency (RF) communications services in a remote unit in a distributed communications system (DCS), comprising:
    receiving unlicensed downlink RF communications signals from at least one downlink communications medium;
    receiving unlicensed uplink RF communications signals from user equipment (UE) over at least one antenna;
    communicating the received unlicensed downlink RF communications signals over the least one antenna to UE;
    receiving unlicensed RF communications signals in at least one unlicensed communications signal path;
    distributing the unlicensed RF communications signals over at least one uplink communications medium;
    monitoring the unlicensed RF communications signals in the at least one unlicensed communications signal path;
    determining unlicensed signal activity of the unlicensed RF communications signals in the at least one unlicensed communications signal path; and
    selectively disabling the at least one unlicensed communications signal path based on the determined unlicensed signal activity exceeding a defined signal activity level.

2. The method of claim 1, further comprising selectively enabling the at least one unlicensed communications signal path based on the determined unlicensed signal activity not exceeding the defined signal activity level.

3. The method of claim 1, wherein:
    monitoring the unlicensed RF communications signals comprises monitoring unlicensed channels in the unlicensed uplink RF communications signals in the at least one unlicensed communications signal path;
    determining the unlicensed signal activity comprises determining unlicensed channel activity of the unlicensed channels in the at least one unlicensed communications signal path; and
    selectively disabling the at least one unlicensed communications signal path comprises selectively disabling the at least one unlicensed communications signal path based on the determined unlicensed channel activity exceeding a defined channel activity level.

4. The method of claim 3, further comprising selectively enabling the at least one unlicensed communications signal path based on the determined unlicensed channel activity not exceeding the defined channel activity level.

5. The method of claim 1, wherein:
    determining the unlicensed signal activity comprises determining the unlicensed signal activity of the unlicensed RF communications signals by being configured to determine an unlicensed signal occupancy rate of the unlicensed RF communications signals in the at least one unlicensed communications signal path; and
    selectively disabling the at least one unlicensed communications signal path comprises selectively disabling the at least one unlicensed communications signal path based on the determined unlicensed signal occupancy rate exceeding a defined unlicensed signal occupancy rate.

6. The method of claim 5, further comprising selectively enabling the at least one unlicensed communications signal path based on the determined unlicensed signal occupancy rate not exceeding the defined unlicensed signal occupancy rate.

7. The method of claim 1, wherein:
    receiving the unlicensed uplink RF communications signals comprises receiving me unlicensed uplink RF communications signals in an unlicensed uplink communications signal path;
    monitoring the unlicensed uplink RF communications signals comprises monitoring the unlicensed uplink RF communications signals in the unlicensed uplink communications signal path; and
    selectively disabling the at least one unlicensed communications signal path comprises selectively disabling the unlicensed uplink communications signal path based on the determined unlicensed signal activity exceeding the defined signal activity level.

8. The method of claim 7, wherein:
    monitoring the unlicensed uplink RF communications signals comprises monitoring unlicensed uplink channels in the unlicensed uplink RF communications signals in the unlicensed uplink communications signal path;
    determining the unlicensed signal activity comprises determining unlicensed uplink channel activity of the unlicensed uplink channels in the unlicensed uplink communications signal path; and
    selectively disabling the unlicensed uplink communications signal path comprises selectively disabling the unlicensed uplink communications signal path based on the determined unlicensed uplink channel activity exceeding a defined uplink channel activity level.

9. The method of claim 8, wherein:

determining the unlicensed signal activity comprises determining an unlicensed uplink signal occupancy rate of the unlicensed uplink RF communications signals in the unlicensed uplink communications signal path; and selectively disabling the unlicensed uplink communications signal path comprises selectively disabling the unlicensed uplink communications signal path, based on the determined unlicensed uplink signal occupancy rate exceeding the defined signal activity level.

10. The method of claim 9, further comprising selectively enabling the unlicensed uplink communications signal path, based on the determined unlicensed uplink signal occupancy rate not exceeding the defined signal activity level.

11. The method of claim 1, further comprising:

receiving licensed downlink RF communications signals from the at least one downlink communications medium;

receiving licensed uplink RF communications signals from UE over the at least one antenna;

communicating the received licensed downlink RF communications signals over the at least one antenna to UE;

receiving the licensed uplink RF communications signals in at least one licensed communications signal path;

receiving the licensed downlink RF communications signals in the at least one licensed communications signal path; and coupling the licensed uplink RF communications signals to the at least one uplink communications medium.

12. The method of claim 11, wherein:

receiving the licensed uplink RF communications signals comprises receiving the licensed uplink RF communications signals in a licensed uplink communications signal path; and receiving the licensed downlink RF communications signals comprises receiving the licensed downlink RF communications signals in a licensed downlink communications signal path.

13. The method of claim 12, comprising:

receiving combined downlink RF communications signals comprising the licensed downlink RF communications signals and the unlicensed downlink RF communications signals from the at least one downlink communications medium;

receiving combined uplink RF communications signals comprising the unlicensed uplink RF communications signals and the licensed uplink RF communications signals for coupling to the at least one uplink communications medium;

separating the combined downlink RF communications signals into the unlicensed downlink RF communications signals and the licensed downlink RF communications signals; and combining the unlicensed uplink RF communications signals and the licensed uplink RF communications signals into the combined uplink RF communications signals.

14. The method of claim 13, further comprising distributing the unlicensed uplink RF communications signals over the at least one uplink communications medium to a central unit.

15. A distributed communications system (DCS), comprising:

a central unit configured to:
  receive unlicensed uplink radio-frequency (RF) communications signals over at least one uplink communications medium from a plurality of remote units; and
  distribute the unlicensed uplink RF communications signals to at least one source transceiver;
  receive unlicensed downlink RF communications signals from the at least one source transceiver; and
  distribute the unlicensed downlink RF communications signals over at least one downlink communications medium to the plurality of remote units;

each remote unit among the plurality of remote units, comprising:
  at least one downlink communications interface configured to receive the unlicensed downlink RF communications signals from the at least one downlink communications medium;
  at least one antenna configured to receive the unlicensed uplink RF communications signals from user equipment (UE) and distribute the unlicensed downlink RF communications signals to UE;
  at least one unlicensed communications signal path configured to receive at least one of the unlicensed uplink RF communications signals and the unlicensed downlink RF communications signals, the at least one unlicensed communications signal path comprising:
    at least one signal path control circuit configured to be selectively controlled to enable and disable the at least one unlicensed communications signal path; and
  at least one uplink communications interface configured to receive the unlicensed uplink RF communications signals for distributing the unlicensed uplink RF communications signals over the at least one uplink communications medium to be received by the central unit;

a remote unit controller configured to:
  monitor unlicensed RF communications signals in the at least one unlicensed communications signal path;
  communicate an unlicensed signal report regarding the unlicensed RF communications signals in the at least one unlicensed communications signal path for each remote unit among the plurality of remote units to a central controller; and
  selectively control the at least one signal path control circuit to disable the at least, one unlicensed communications signal path in response to receipt of an unlicensed disable command;

the central controller configured to:
  receive the unlicensed signal report from each remote unit among the plurality of remote units;
  determine unlicensed signal activity for each remote unit among the plurality of remote units based on the received unlicensed signal report from each remote unit among the plurality of remote units; and
  selectively communicate an unlicensed disable command to the remote unit controller of at least one remote unit among the plurality of remote units to cause the remote unit controller of the at least one remote unit to disable the at least one signal path control circuit of the at least one remote unit to disable the at least one unlicensed communications signal path of the at least one remote unit, based on the unlicensed signal activity in the plurality of remote units.

16. The DCS of claim 15, wherein:
the remote unit controller of each remote unit among the plurality of remote units is further configured to selectively control the at least one signal path control circuit to enable the at least one unlicensed communications signal path in response to receipt of an unlicensed enable command; and
the central controller is further configured to selectively communicate the unlicensed enable command to the remote unit controller of at least one remote unit among the plurality of remote units to cause the remote unit controller of the at least one remote unit to enable the at least one signal path control circuit of the at least one remote unit to enable the at least one unlicensed communications signal path of the at least one remote unit, based on the unlicensed signal activity in each remote unit of the plurality of remote units.

17. The DCS of claim 15, wherein the central controller is configured to selectively communicate the unlicensed disable command to the remote unit controller of the at least one remote unit, based on the determined unlicensed signal activity in the at least one remote unit exceeding a defined signal activity level.

18. The DCS of claim 15, wherein the central controller is configured to:
determine the unlicensed channel activity by being configured to determine an aggregate unlicensed signal activity of the unlicensed RF communications signals in each remote unit among the plurality of remote units based on the received unlicensed signal report from each remote unit among the plurality of remote units; and
selectively communicate the unlicensed disable command by being configured to selectively communicate the unlicensed disable command to the remote unit controller of the at least one remote unit, based on the determined aggregate unlicensed signal activity exceeding a defined channel activity level.

19. A method for providing radio-frequency (RF) communications services in a remote unit in a distributed communications system (DCS), comprising:
receiving unlicensed uplink RF communications signals over at least one uplink communications medium from a plurality of remote units;
distributing the unlicensed uplink RF communications signals to at least one source transceiver;
receiving unlicensed downlink RF communications signals from the at least one source transceiver;
distributing the unlicensed downlink RF communications signals over at least one downlink communications medium to the plurality of remote units;
receiving an unlicensed signal report from each of the plurality of remote units regarding unlicensed RF communications signals comprising at least one of the unlicensed uplink RF communications signals and the unlicensed downlink RF communications signals in at least one unlicensed communications signal path for the remote unit;
determining unlicensed signal activity for each remote unit among the plurality of remote units based on the received unlicensed signal report from each remote unit among the plurality of remote units; and
selectively communicating an unlicensed disable command to a remote unit controller of at least one remote unit among the plurality of remote units to cause the remote unit controller of the at least one remote unit to disable the at least one unlicensed communications signal path of the at least one remote unit, based on the unlicensed signal activity in the plurality of remote units.

20. The method of claim 19, further comprising selectively communicating an unlicensed enable command to the remote unit controller of the at least one remote unit among the plurality of remote units to cause the remote unit controller of the at least one remote unit to enable the at least one unlicensed communications signal path of the at least one remote unit, based on the unlicensed signal activity in each of the plurality of remote units.

21. The method of claim 1, wherein the at least one unlicensed communications signal path is in the remote unit.

* * * * *

UNITED STATES PATENT AND TRADEMARK OFFICE
CERTIFICATE OF CORRECTION

PATENT NO. : 10,425,828 B2  
APPLICATION NO. : 15/831968  
DATED : September 24, 2019  
INVENTOR(S) : Shekalim Page 1 of 1

It is certified that error appears in the above-identified patent and that said Letters Patent is hereby corrected as shown below:

On the Title Page

In Column 1, item (65), Line 2, below "US 2018/0098226 A1" insert -- Related U.S. Application Data (63) Continuation of 15/086,804 filed on Mar. 31,2016. --.

In the Claims

In Column 26, Line 41, Claim 7, delete "me" and insert -- the --, therefor.

In Column 28, Line 49, Claim 15, delete "at least," and insert -- at least --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*